United States Patent
Daly et al.

(10) Patent No.: US 10,324,164 B1
(45) Date of Patent: Jun. 18, 2019

(54) SYSTEMS AND METHODS FOR RADAR CHARACTERIZATION AND MODEL FORMATION

(71) Applicants: Erin L. Daly, San Diego, CA (US); Mark W. Owen, San Diego, CA (US); Warran Ho Can, San Diego, CA (US); Gregory K. Fleizach, San Diego, CA (US); Everett W. Sappenfield, San Diego, CA (US)

(72) Inventors: Erin L. Daly, San Diego, CA (US); Mark W. Owen, San Diego, CA (US); Warran Ho Can, San Diego, CA (US); Gregory K. Fleizach, San Diego, CA (US); Everett W. Sappenfield, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 306 days.

(21) Appl. No.: 15/332,815

(22) Filed: Oct. 24, 2016

Related U.S. Application Data

(60) Provisional application No. 62/247,959, filed on Oct. 29, 2015.

(51) Int. Cl.
G01S 7/02 (2006.01)

(52) U.S. Cl.
CPC .................... *G01S 7/021* (2013.01)

(58) Field of Classification Search
CPC .............................. G01S 7/021; G01R 23/155
USPC ...................................................... 342/13–20
See application file for complete search history.

(56) References Cited

U.S. PATENT DOCUMENTS

| | | | |
|---|---|---|---|
| 6,940,450 B2 * | 9/2005 | Blunt | G01S 7/2921 342/118 |
| 7,034,738 B1 * | 4/2006 | Wang | G01S 7/021 342/13 |
| 7,397,415 B1 * | 7/2008 | Wang | G01S 7/021 342/13 |

(Continued)

*Primary Examiner* — Marcus E Windrich
(74) *Attorney, Agent, or Firm* — NavInfWarCen Pacific; Arthur K. Samora; Kyle Eppele

(57) ABSTRACT

Methods for characterizing radar can include the steps of receiving a plurality of radar emissions, and determining a plurality of Pulse Repetition Intervals (PRIs) corresponding to the emissions. A plurality of clocks $X_i$ can be calculated using the PRIs. A clock range and a clock interval can be defined for the plurality of calculated clocks $X_i$ and a clock X can be estimated, but only for the clocks $X_i$ that are within the defined clock range. Countdowns $C_i$ can be determined using the calculated clock X, and a mode M and crystal b can be calculated based on $C_i$. Clock X, countdowns $C_i$, mode M and crystal b, when considered together can accurately characterize a specific radar emission (and radar the emission came from). The systems and methods can be accomplished using emissions that are being received in real time using a receiver and emissions data from a database simultaneously.

4 Claims, 15 Drawing Sheets

(56) References Cited

U.S. PATENT DOCUMENTS

| | | | | |
|---|---|---|---|---|
| 7,830,297 B1* | 11/2010 | Wang | ............... | G01S 7/021 |
| | | | | 342/13 |
| 8,531,330 B2* | 9/2013 | Song | ............... | G01S 7/021 |
| | | | | 342/13 |
| 8,587,468 B2* | 11/2013 | Card | ............... | G01S 7/42 |
| | | | | 342/13 |
| 9,519,049 B1* | 12/2016 | Kadambe | ............... | G01S 7/021 |
| 2008/0192864 A1* | 8/2008 | Szajnowski | ............... | G01S 7/021 |
| | | | | 375/340 |
| 2010/0283666 A1* | 11/2010 | Lee | ............... | G01S 3/74 |
| | | | | 342/175 |

* cited by examiner

SYSTEMS AND METHODS FOR RADAR CHARACTERIZATION AND MODEL FORMATION

CROSS REFERENCE TO RELATED APPLICATIONS

This application claims the benefit of U.S. Provisional Application 62/247,959, filed Oct. 29, 2015, by Erin L. Daly, et al., entitled "Systems And Methods For Radar Characterization And Model Formation". The contents of the '822 application are hereby incorporated by reference into this specification.

FEDERALLY-SPONSORED RESEARCH AND DEVELOPMENT

This invention (Navy Case No. 103528) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-5118; email ssc_pac_T2@navy.mil.

FIELD OF THE INVENTION

The present invention pertains generally to systems and methods for characterizing radar parameters. More specifically, this invention pertains to systems and methods for more efficiently correlating signals intelligence (SIGINT) inputs from disparate maritime, land, and air platforms, in order to rapidly characterize previously unknown radars.

BACKGROUND OF THE INVENTION

Radars are well known in the prior art for determining the range of targets. For operation, radars send an electromagnetic pulse, which hits an object and comes back. But to obtain a correct range to the target, the target must be within the maximum unambiguous range of the radar, in order for the bounced signal to be received before the next pulse is sent. More specifically, suppose a type of radar sends a pulse every T μsecs. In order for the return signal to be received before the next pulse is sent, the round trip time must be less than T μsecs. Thus, the maximum unambiguous range, D, for the radar can be defined in terms of this time value, T and speed of light.

The time between the start of consecutive radar transmissions or electromagnetic pulses can be defined in the prior art as the Pulse Repetition Interval (PRI), also called the pulse period or ranging interval. When a radar emission is evaluated, estimation of the emission parameters and characterization when compared to other radars can be based on analysis of the radar PRI information from the intercepted return pulse emission. Thus, PRI can be a good starting point to characterize a radar based on the intercepted emission. But PRI by itself is typically not enough for a good characterization of the emission (and the radar it came from). To increase the level of confidence in the characterization of the emission, other parameters need to be considered. These other parameters can include the radar clock, crystal, mode and countdowns.

But the characterization of PRIs, clocks, crystals, modes and countdowns can require the consideration of a massive amount of data, and might even be impossible for an analyst to accomplish by oneself. What is needed is a system that can automatically characterize radars using numerous radar parametric modeling techniques, that can rapidly process live data, and that can reduce the time, number of complex tools, and manual operations that analysts currently perform to complete their daily tasks. Such a system would allow analysts to focus their efforts on evaluating and verifying the resulting models, instead of focusing on sorting through tremendous amounts of data.

In view of the above, an object of the present invention can be to provide systems and methods for radar characterization and model formation that automate the signals intelligence (SIGINT) manual processes on board maritime, land, and air platforms, in order to rapidly characterize previously unknown radars. Yet another object of the present invention can be to provide systems and methods for radar characterization and model formation that automatically correlate contact reports to form tracks, that estimate values for unknown radar parameters (clock, crystal, mode, and countdowns), and that group tracks with similar parameters to form comprehensive models for different types of radar. Still another object of the present invention can be to provide systems and methods for radar characterization and model formation that function as an analyst multiplier by reducing the analysis process from hours to seconds, to enable real-time processing and analysis of worldwide data. Another object of the present invention can be to provide systems and methods for radar characterization and model formation that can automatically identify and combine similar tracks from around the world to produce robust radar parameter models that may not be discoverable by a single analyst conducting manual processes. Another object of the present invention to provide systems and methods for radar characterization and model formation that can be implemented in a cost-effective manner.

SUMMARY OF THE INVENTION

Methods for characterizing a radar can include the steps of receiving a plurality of radar emissions, and determining a plurality of Pulse Repetition Intervals (PRIs) corresponding to said emissions. A plurality of clocks $X_i$ can then be calculated using the determined PRIs. A clock range and a clock interval can be defined for the plurality of calculated clocks $X_i$, and a clock X can be estimated using a root means square error (RMSE) method, but only for the plurality of clocks Xi that are within the defined clock range. The use of a predefined clock interval and clock can greatly cut down the characterization time, and even allow for accomplishment of the methods in real time.

The systems and methods according to several embodiments can further include the steps of calculating a set of countdowns $C_i$ corresponding to the plurality of determined PRI's (using the estimated clock), calculating a mode M based on the countdowns $C_i$, and calculating a crystal b based on said mode M. The clock X, countdowns Ci, mode M and crystal b, when considered together can accurately characterize a specific radar emission (and where radar the emission came from). The systems and methods can be accomplished using emissions that are being intercepted in real time using a receiver, that can input the intercepted emissions into the methods, or using emissions from a database that can be input into a receiver, or in real time using a combination of receiver emissions and emissions data from the database.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

For the systems and methods of the present invention, the following definitions can be used:

X (clock) can be the basic oscillator period used as a timing reference for range delay and synchronization when generating new radar pulses; a single type of radar can use multiple different clocks for generating pulses.

PRI (Pulse Repetition Interval) can be the time measured from the leading edge of one radar pulse to the leading edge of the next radar pulse. PRI can be a multiple of the period of the clock.

Crystal, b, can be defined as the high frequency fundamental oscillating source used to control radar PRI values; all pulses generated by a type of radar use the same fixed crystal period.

Count $c_i$ with $i=1, \ldots, n$ can be an integer multiplier used by the PRI generator for selecting which range marker pulses inside the radar circuitry to use for PRI generation.

Countdown set $C=\{c_1, c_2, c_3, \ldots, c_{n-2}, c_{n-1}, c_n\}$ can be the set of counts used for PRI generation. The countdown set C can be used to generate multiple position PRI sequences, pseudo-random jitter, and PRI switching.

The mode M can be an integer value used to transform the crystal period to the clock period; stated differently, the clock period can be an integer multiple (mode) of the crystal period. A single type of radar can use multiple different modes for generating pulses; this value changes as the clock and PRIs change. The different modes can be observed from different parts of the world and then recorded in database 19, for incorporation by the systems and methods of the present invention.

Figure 1:
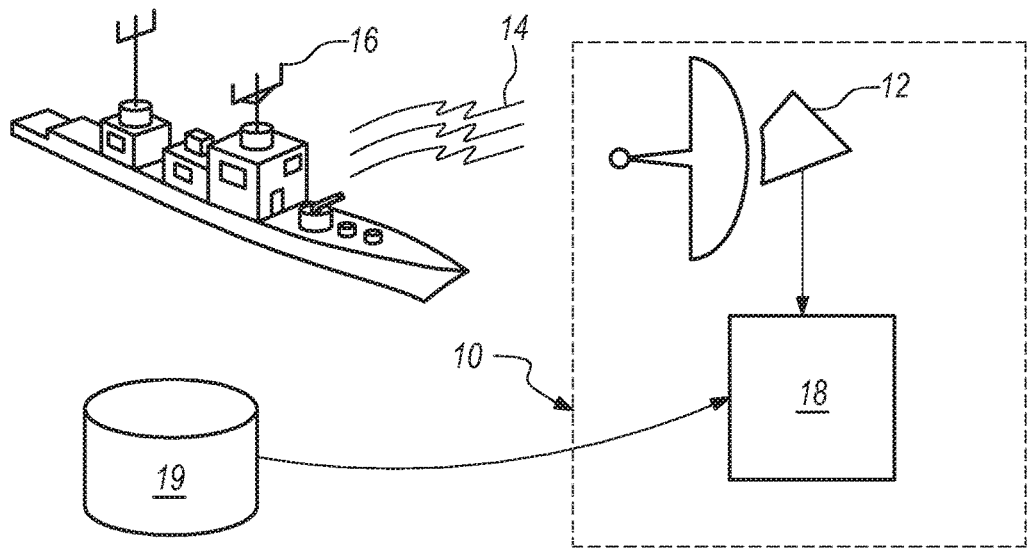
FIG. 1 is a diagram of a system of the present invention according to several embodiments.

Referring initially to FIG. 1, the system of the present invention according to several embodiments can be shown and can be designated using reference character 10. As shown, system 10 can include a receiver 12. Receiver 12 can receive a return emission (pulse) 14 from a radar-of-interest (or radar) 16. A processor 18 can be connected to receiver 12. The processor 18 can also receive pulse information that has previously been stored in database 19, and processor 18 can include non-transitory written instructions that, when accomplished, can perform reverse engineering on the return emission 14 to characterize (model) the radar-of-interest 16. More specifically, the sequence of PRIs from emissions 14 from radar-of-interest 16 can be reverse engineered to estimate the identifying characteristics of the radar-of-interest 16, such as clock, crystal, countdown, and mode (X, PRI, b, C and M, as defined above), to characterize (model) the radar. This is possible because the clock multiplied by a set of countdown integers creates the sequence of PRIs that are measured by the collector 12 and provided as input to the invention systems and methods of the present invention. The manner in which the methods according to several embodiments are accomplished is discussed more fully below.

To accomplish the reverse engineering, and as mentioned above in the definitions, PRI can be defined using the identifying parameters below:

$$PRI = X^*C \text{ with } PRI, X \in \mathbb{R} \text{ and } C \in \mathbb{Z}$$

where X can be called the clock and C can be defined as the countdown (see definitions above). For radars that have a staggered sequence of multiple PRIs from a single emitter, the set of PRIs P can be $$P = \{PRI_1, PRI_2, \ldots, PRI_n\} = X^*\{c_1, c_2, \ldots, c_n\}$$

where $c_i$ can be the respective counts and the sequence of counts can be called the countdown C. Thus, we can mathematically define $$PRI_i = X^* c_i \tag{1}$$

The clock X can be further defined as $$X = b^*M \text{ with } b \in \mathbb{R} \tag{2}$$

where b can be the crystal and M can be the mode, as defined above. Each type of radar uses a single crystal value for all transmissions. The mode(s) are the integers that multiply the crystal and generate different clocks for the radar to use. The counts are the integers that multiply the clocks and generate the PRIs for the radar-of-interest 16. Thus, one type of radar-of-interest 16 can use multiple modes, which can produce multiple clocks, which when multiplied by the counts, can produce different observable PRIs.

From Equations (1) and (2), one can explicitly define the identifying parameters (countdown, mode, and crystal) using the following relationships:

$$PRI_i = X * c_i \Rightarrow c_i = \frac{PRI_i}{X} \qquad (3)$$

$$X = b * M \Rightarrow b = \frac{X}{M} \qquad (4)$$

$$X = b * M \Rightarrow M = \frac{X}{b} \qquad (5)$$

Estimated solutions to the unknowns in the underdetermined system in (1), using Equations (2-5), can produce possible values for crystal, mode, and countdown for an intercepted sequence of PRIs.

From reviewing Equations (1)-(5), it can be inferred that the same PRI value for the radar-of-interest 16 can be produced by different combinations of the fundamental crystal with different clocks, modes, and countdowns. Therefore, accurate characterization of the radar-of-interest requires identification of each individual parameter. Each type of radar has a single identifying crystal and set of countdowns along with various operating modes and associated clocks which are chosen from a preset collection of identifying values. If they pertain to the same radar, these combinations of values each satisfy Equation (1). The radar 16 transmitting the pulses 14 can be set to operate in a specific mode, which then dictates the corresponding clock value and thus the PRIs that are generated.

Equations (3)-(5) can be expanded to illustrate the fixed crystal and countdowns along with various operating modes and associated clocks for a single type of radar:

$$PRI_i = X_k * c_i \Rightarrow c_i = \frac{PRI_i}{X} \text{ with } k = 1, \ldots, K \qquad (3a)$$

$$X_k = b * M_j \Rightarrow b = \frac{X_k}{M_j} \text{ with } k = 1, \ldots, K \text{ and } j = 1, \ldots, m \qquad (4a)$$

$$X_k = b * M_j \Rightarrow M_j = \frac{X_k}{b} \text{ with } k = 1, \ldots, K \text{ and } j = 1, \ldots, m \qquad (5a)$$

The goal of this invention can be to quickly and automatically determine the various combinations of values that satisfy the system in (1), using Equations (3a)-(5a), for collections of contact reports that are using the same type of radar for transmission of emission 14, either from the same radar-of-interest 16 or from a different source.

A single intercepted emission, called a contact report, can contain a single PRI value or a sequence of PRIs. The accuracy of the estimated parameters is improved with more contact reports (i.e. more PRIs). Various multi-source correlation programs can process collections of contact reports to combine them into radar tracks. The radar parameter values across a track should be the same or at least extremely similar. More specifically, a single track will transmit pulses using a single type of radar, but successive transmissions form the same track, T, may use a different clock or mode. The accurate formation of tracks, consisting of similar contact reports, as well as the formation of groups of similar tracks worldwide is critical to the robustness and quality of estimated radar models. The goal of this invention can be to use the output tracks from multiple sources and form comprehensive models of types of radars.

Figure 2:
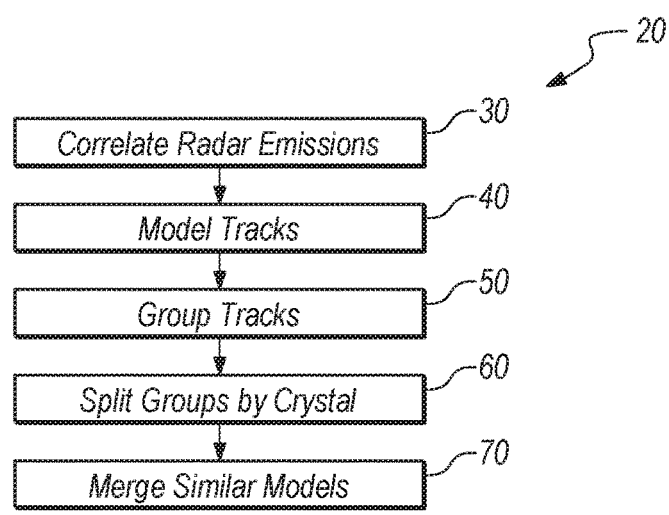
FIG. 2 is a block diagram, which shows steps that the system of FIG. 1 can take to accomplish the methods of the present invention according to several embodiments.
Figure 3:
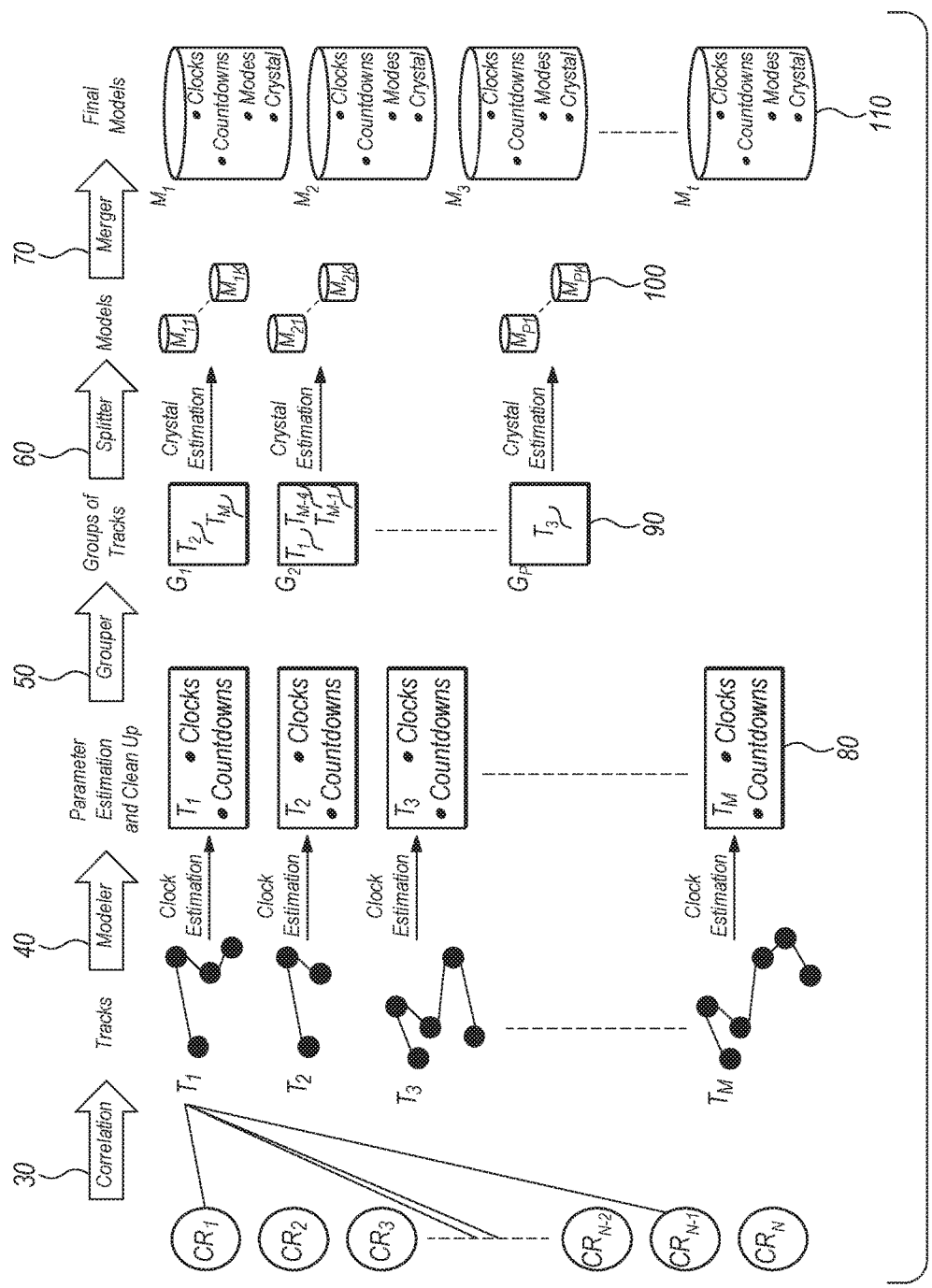
FIG. 3 is a diagram which more fully describes the steps and the results of the steps from FIG. 2.

Referring now to FIGS. 2 and 3, a block diagram that is illustrative of the methods of the present invention according to several embodiments can be shown and can be generally designated by reference character 20. As shown, method 20 can include the initial step of correlating contact reports to form comprehensive tracks, as shown by block 30 in FIG. 2. The methods can further include the step 40 of modeling the emission(s) from the track(s) from step 30. To do this, a radar clock X for each contact report can be estimated using information from the whole track; the counts can be calculated for each contact report (CR) based on estimated radar clock X and PRIs; and, clock and countdown outliers can be eliminated according to a preselected criteria to determine a final set of clocks and countdowns for each track.

As shown in FIG. 2, method 20 can further include the step 50 of grouping tracks with similar attributes, i.e., with matching countdown, similar clocks, etc., and then splitting the group tracks, as shown in block 60. The splitting step can be accomplished by estimating all possible crystal(s) for each group 90 (G) of tracks 80 (T), from step 50, splitting the groups of tracks into smaller groups G based on best-fitting estimated crystal(s), and forming a draft model 100 for each crystal and associated countdown and clocks. Finally, the methods according to several embodiments can include the step 70 of merging similar models that were created by different batches of data to yield a final model 110. Each of the steps 30-70 from the methods 20 can be described more fully below.

A. Correlation of Radar Transmissions to Form Tracks

The correlation step 30 of process 20 for the systems and methods of the present invention can be completed by any multi-source correlation methodology. One such external multi-source correlation program can be the Department of the Navy, Space and Naval Warfare (SPAWAR) Systems Center, Pacific-developed Leveraging Available Information Sources to Improve Correlation (LAISIC). Other correlation methods could be used. As shown in FIG. 3, the contact reports $CR_1$ through $CR_N$ can be correlated to make up track $T_1$. It should be appreciated that tracks $T_2$ through $T_M$ also have contact reports $CR_1$ through $CR_N$, but they are not shown in FIG. 3 for increased clarity. Tracks T from the correlation step can be continuously batch processed using the systems and methods of the present invention to allow for near real-time radar modeling.

B. Modeling of Tracks

1. Contact Report Clock Estimation

Figure 4:
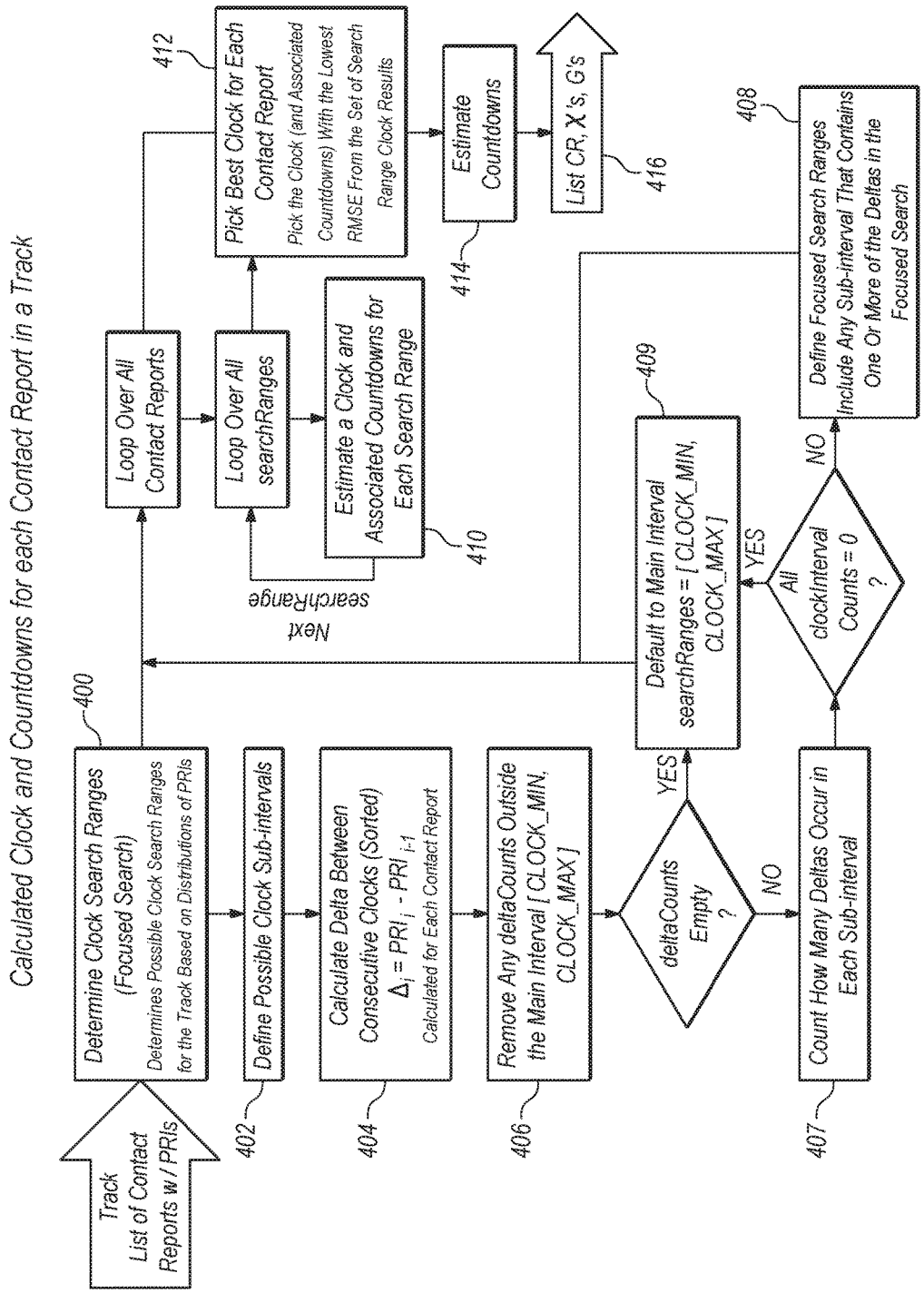
FIG. 4 is a block diagram, which shows steps that can be taken to estimate contact report counts and countdowns pertaining to the modeling step of FIG. 2.

To accomplish the modeling step 40, the first unknown parameter from Equation (1) that can be estimated by the systems and methods of the present invention can be the estimation of the radar clock X. As explained above, this is the value that can be multiplied by a set of integers (unknown at this point in the invention methods) to create the sequence of PRIs collected by the receiver 12 and measured by system 10. For modeling step 40, an estimated radar clock value X can be determined for each contact report CR on a track T. The process of calculating the X for each CR (as shown by a flowchart) is illustrated in FIG. 4.

It should be appreciated that the only information known about $CR_1$ through $CR_N$ at this time (the start of the accomplishment of step 40 of method 20) is the set of real valued PRIs for each contact report $CR_1$ through $CR_N$ (the contact reports for track $T_1$ in FIG. 3) from emission 14, which have been received by receiver 12 and input into processor 18 (information can also be received from database 19). The best clock estimate for a contact report CR can defined as the value that minimizes the error between the exact real-valued counts in Equation (3), using the known PRIs from pulses 16 and candidate clock estimates, and the closest integer count values (using real valued count values that have been rounded to the nearest integer). The clock value for a contact report can be calculated based on the root mean square error (RMSE) over all the received PRIs in the contact report. More specifically, the best clock estimate within an estimated clock range [a, b] for a single contact report can be defined as the value that minimizes the RMSE in Equation (6).

$$RMSE(X) = \sqrt{\frac{\sum_{i=0}^{n}\left(\frac{PRI_i}{X} - \text{round}\left(\frac{PRI_i}{X}\right)\right)^2}{n}} \text{ with } X \in [a, b] \quad (6)$$

Therefore, for all possible clock values $X_1$ within range [a, b], a single, best clock value, X, for the contact report can be found such that $$RMSE(X) = \min_t[RMSE(X_t)] = \quad (7)$$

$$\min_t\left[\sqrt{\frac{\sum_{i=0}^{n}\left(\frac{PRI_i}{X} - \text{round}\left(\frac{PRI_i}{X}\right)\right)^2}{n}}\right] \text{ with } X_t \in [a, b]$$

NOTE: The t notation can be used here to distinguish the potential contact report clocks from the overall final set of radar clocks $X_k$ The clock value that satisfies Equation (7) could generally be found through an iterative broad search over all possible values within a defined search range [a, b] at a chosen granularity. However, such a method would be inefficient. This is why, for several embodiments, correlation step 30 can be accomplished prior to the modeling step 40 in the method 20, step 30 can be accomplished to correlate the contact reports to form tracks T (See FIGS. 2 and 3). In most cases, the clock value for an individual contact report on a given track T will be close, if not equal, to the clocks for all other contact reports on that same track T. Thus, the search range [a, b] used for clock estimation for each contact report on a track T can be greatly reduced by using information from the track as a whole.

There can be pre-defined clock minimum values and maximum values that can be used as the upper and lower bounds of the main clock search region for all tracks. Similarly, and as shown by step 402 in FIG. 4, there can be a pre-defined interval size, α, that is used to divide the main interval into sub-intervals of equal size to be used for the focused clock searches for all contact reports and for all tracks in a problem set. These values depend on the type of data being processed. Thus, the definition of specific values for focused clock searches is outside the scope of the present invention. Suppose the upper and lower bounds of the main clock search region are $$X_{min}=a \text{ and } X_{max}=b$$

Then, using a pre-defined interval size, α, sub-intervals of [a,b] can be defined as $$\{[a,a+\alpha],[a+\alpha,a+2\alpha],[a+2\alpha,a+3\alpha], \ldots ,[b-\alpha,b]\} \quad (8)$$

This same set of sub-intervals in (8) can be used to determine the best clock estimate $X_i$ for each contact report $CR_i$ on a track $T_i$, and for all tracks T in a problem set.

To reiterate the above, once the general sub-intervals of the large clock search region are defined, the best candidate sub-intervals for each track T can be determined. As shown by block 400 in FIG. 4, the collection of all PRIs from all contact reports on a track T can be used to narrow down the large clock search region [a,b] to a subset of candidate search regions(s) (i.e., sub-intervals of [a,b]) from (8) that are likely to contain the best clock estimate. The systems and methods of the present invention can determine the candidate search region(s) for each track T. To define the candidate search region(s) for a track T, a comprehensive list of all PRIs from all the contact reports CR in track T can be constructed and sorted in ascending numerical order.

Whether or not a sub-interval in (8) is a good candidate search region or not for a track T can be based on the frequently occurring differences (deltas) between successive PRI values from the contact reports in track T. This delta value can be calculated for each PRI, except the first PRI due to boundary issues, using Equation (9). This is shown in block 404 of FIG. 4.

$$\Delta_i = |PRI_i - PRI_{i-1}| \text{ for } i=1, \ldots ,n \quad (9)$$

The set of delta values $\Delta_i$ that result from the accomplishment of step 404 and Eq. (9) can be sorted in ascending numerical order. Delta values that are outside the main clock search interval [a, b] can be removed (block 406 in FIG. 4). The remaining deltas can be evaluated to identify which sub-interval from (8) that they fall within (i.e., to count how many deltas are within a given sub-interval, block 407). Any sub-interval that contains more than one delta value is included in the focused sub-interval search range set for the track, as illustrated by block 408 in FIG. 4. Any sub-interval that does not contain a delta value is removed from consideration for the focused sub-interval range set for the track. A different focused sub-interval range set is determined for each individual track T in the problem set.

As an example of the above, consider the following scenario with a main clock search region for all tracks defined by Equation (8):

$$X_{min}=10 \text{ and } X_{max}=16$$

Then using an interval size α=1 the sub-intervals of [10, 16] can be defined in Eq. (8) as:

$$\{|10,11|,|11,12|,|12,13|,|13,14|,|14,15|,|15,16|\}$$

Suppose a track contains the following PRI values (sorted):

$$\{20,20.1,31,31.4,46.5,56.9,57,67.5,67.7,67.8,82.1,$$
$$82.2,93.4,108.1,118.4\}$$

The above set of data can result in the following deltas (sorted), Eq. (9):

$$\{0.1,0.1,0.1,0.1,0.2,0.4,10.3,10.4,10.5,10.9,11.2,14.3,$$
$$14.7,15.1\}$$

The delta values outside of the main clock search region [10, 16] can be thrown out leaving the following deltas (sorted) within the main clock search region:

$$\{10.3,10.4,10.5,11.2,14.3,14.7,15.1\}$$

The results are summarized in the following Table 1:

TABLE 1

| Sub-Interval Min | Sub-Interval Max | Deltas in Sub-Interval | Count of Deltas in Sub-Interval |
|---|---|---|---|
| 10 | 11 | 10.3, 10.4, 10.5, 10.9 | 4 |
| 11 | 12 | 11.2 | 1 |
| 12 | 13 |  | 0 |

TABLE 1-continued

| Sub-Interval Min | Sub-Interval Max | Deltas in Sub-Interval | Count of Deltas in Sub-Interval |
|---|---|---|---|
| 13 | 14 |  | 0 |
| 14 | 15 | 14.3, 14.7 | 5 |
| 15 | 16 | 15.1 | 1 |

Therefore, the focused search sub-interval set for this track example would include

{|10,11|,|11,12|,|14,15|,|15,16|}

In cases that there are no delta values within [a, b] for a given track, then the algorithm defaults to a broad search over the main interval [a, b] for that track, block 42 in FIG. 4, as shown by block 409. However, the clock value X that results for each contact report on the track, in this case, may not be the optimal clock value.

Once the sub-intervals have been defined for a track, the systems and methods in the present invention determine the best clock value X for each contact report on the track. First, the clock value X that satisfies Equation (7) can be determined for each of the selected sub-intervals from (8) in the focused search sub-interval set for the track, as shown by block 408. The PRIs from the contact reports can be used to determine the clock values that satisfy Equation (7) for each sub-interval The systems and methods of the present invention iterate through each of the selected sub-intervals in the focused search sub-interval set. This is illustrated by block 410 in FIG. 4. The minimum RMSE, as defined by Equation (7), and the associated clock value, X, can be determined for each of the selected sub-intervals using the PRIs from the contact report. The set of minimum RMSE values for all sub-intervals can be used to determine the best clock X for the contact report. The clock value X associated with the minimum RMSE across the set of all minimum RMSEs from the candidate sub-intervals can be chosen as the estimated clock for the contact report, as shown by step 412 in FIG. 4. The process can be repeated for each contact report on a track to determine the best clock value X for each contact report $CR_N$ in the track $T_M$.

Figure 5:
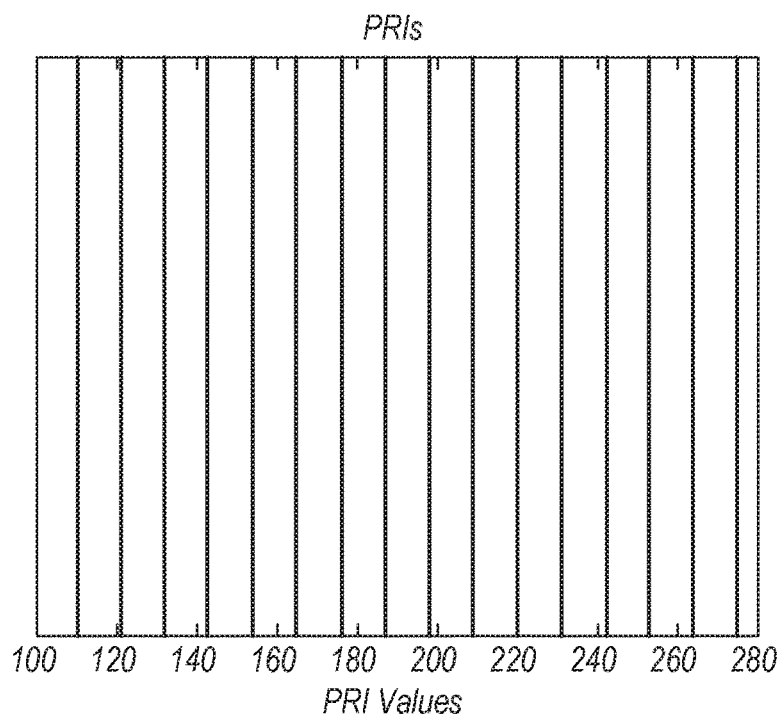
FIG. 5 is a graph that displays the results of the sub-interval selection process of FIG. 4.
Figure 6:
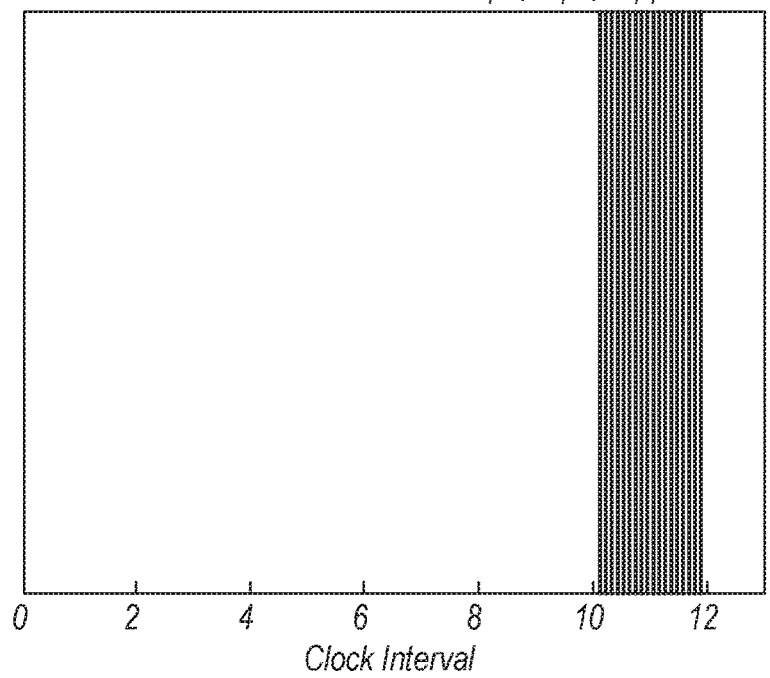
FIG. 6 is a graph which shows the number of PRIs from FIG. 5 in each sub-interval.
Figure 7:
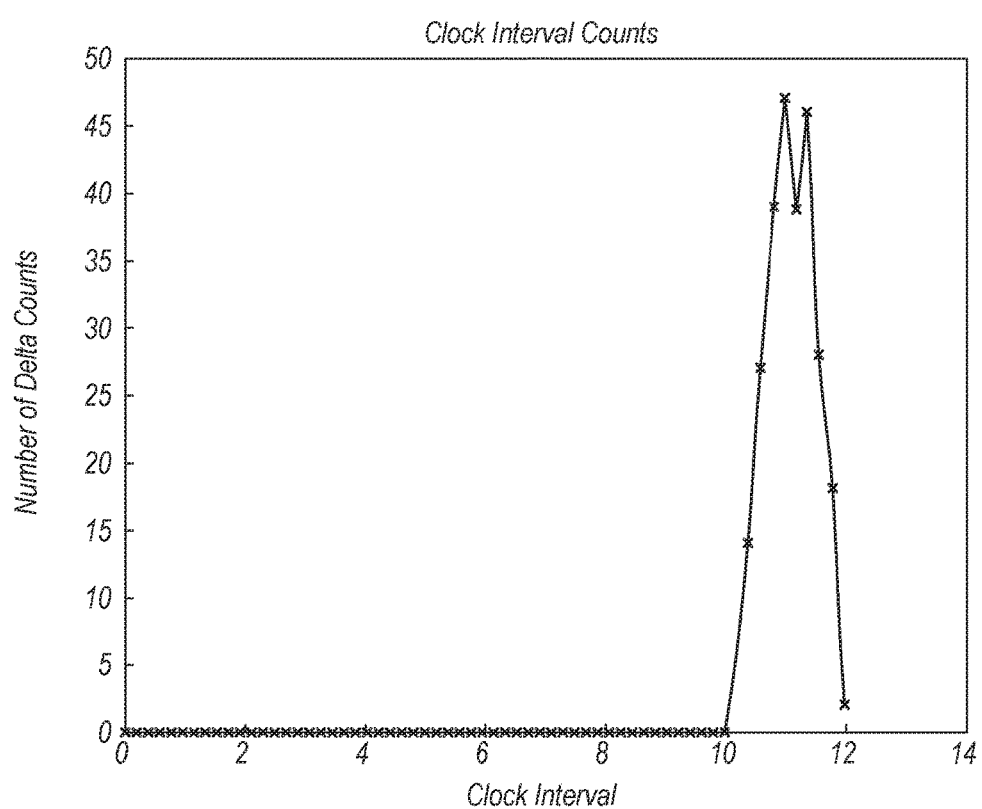
FIG. 7 is a graph which depicts the numerical count from FIG. 6.

FIGS. 5-7 can provide a visual representation of the PRI sorting, delta calculation, and sub-interval delta counting described above for a fabricated set of data with a main clock interval of [10, 12]. In FIG. 5, all PRIs from contact reports $CR_N$ in a track $T_M$ have been combined and sorted within a PRI range of 100 and 280 μsecs. In FIG. 6, sub-intervals of 20 μsecs have been defined and all delta values $\Delta_i$ from the FIG. 5 PRIs have been calculated and sorted using Eq. (8) for each sub-interval. In FIG. 7, the number of delta values Δi in each sub-interval in FIG. 6 have been counted and displayed. As can been seen in FIG. 7, the sub-interval [10, 12] should be focused on to determine the best clock X for each contact report that generated this synthetic data.

Working from the simulated example in FIGS. 5-7, and also referring to FIG. 4, suppose there are three sub-interval search regions for interval [10, 12] (step 407) defined for a contact report $CR_N$ in a given track (step 408):

$[a_1,a_2]=[10.1,10.4]$ $[a_3,a_4]=[10.6,11.0]$ $[a_5,a_6]=[11.1,11.9]$

Then for a given contact report, the systems and methods of the present invention iterates over each sub-interval search region to find the value (clock) within the region that satisfies Equation (7). It determines the following values (Table 2) as possible clocks for the contact report (one from each search region):

TABLE 2

| Estimated Clock Value | RMSE |
|---|---|
| 10.1568 | 0.0002 |
| 10.9856 | 0.00001 |
| 11.5011 | 0.0035 |

Based on Table 2 above, the systems and methods can define the final estimated clock for this contact report as 10.9856, which can be the clock value associated with the minimum RMSE for this contact report across all sub-interval search regions above.

The above process can be repeated for all contact reports in a given track T and for all tracks formed as a result of correlation step 22. Each contact report CR can have a different clock value than other contact reports on the track T particularly for CRs with staggered PRIs. Slight variations in clock can be produced by the same radar mode, while large variations indicate a change in radar mode for the corresponding contact report.

2. Contact Report Countdown Calculation

Referring again to FIG. 4, and as shown by block 414, the second unknown parameter in Equation (1) that can be estimated by the systems and method of the present invention can be the countdown C of integer $c_i$ counts. This set of values can be calculated for each contact report CR in track T based on the estimated radar clock X from step 412 in FIG. 4 and observed PRI's. Each PRI in a contact report CR can have a corresponding countdown value, defined as $$c_i = \text{round}\left(\frac{PRI_i}{X}\right) \in \mathbb{Z} \qquad (10)$$

Once a final clock estimate X has been determined for a contact report $CR_N$, the associated counts can be calculated using the estimated clock X and the received PRIs using (10). The process can be repeated for each contact report CR on the track T. The result can be a list of contact reports with associated clocks X and countdowns $C_i$ for each track, as illustrated by arrow 416 in FIG. 4.

3. Track Clock and Countdown Finalization

Figure 8:
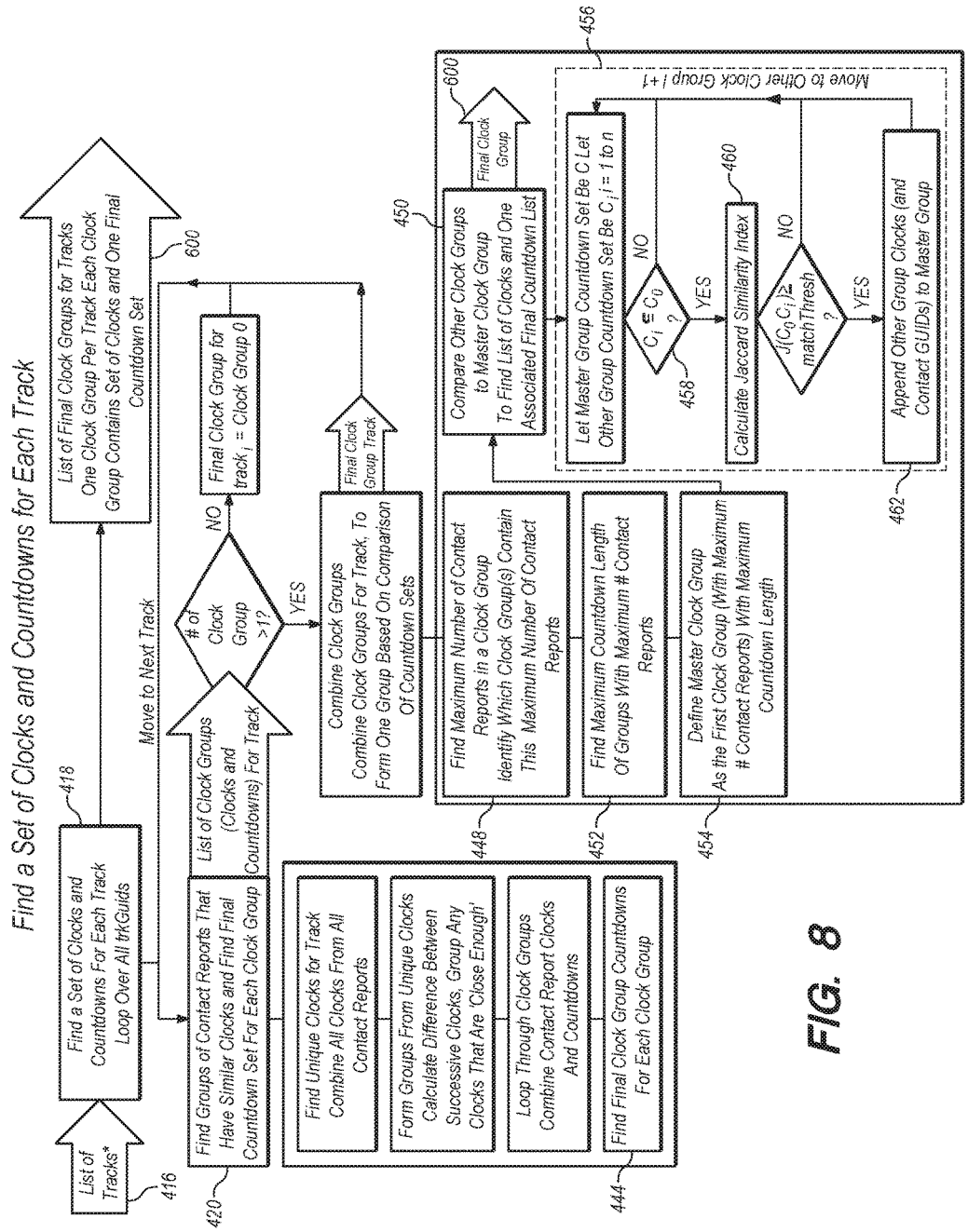
FIG. 8 is a block diagram, which illustrates steps that can be taken to convert the contact report estimates of FIG. 4 to group estimates of clocks and countdowns.

Referring now to FIG. 8, the next sub-step of modeling step 40 in the systems and methods of the present invention can be to combine the clocks and associated integer countdown estimated for each contact report on a track to determine a single set of integer counts (a single countdown) and clocks for each track, as shown by block 418 in FIG. 8. As defined by Equation (10) above, every PRI in a contact report can have an associated countdown value that is calculated based on the estimated radar clock of the contact report and observed PRIs for that CR. Therefore, each contact report and clock will be associated with a single countdown (set of integer counts). The systems and methods of the present invention expect that the clocks estimated for each contact report $CR_i$ on a track T (estimated in the previous step 416) should produce similar, if not identical, countdowns for each contact report across the track. In addition, since each countdown for a contact report is calculated based on the same estimated contact report clock X, the systems and methods of the present invention expects all of the successive counts in each countdown are a similar distance apart. However, in reality, this does not always occur. Erroneous PRI data in as few as one contact report on a track can result in the estimation of invalid clocks and associated invalid (or outlier) counts. Thus, the outlier counts must be identified and eliminated from the final countdown.

The final countdown for a track is determined by analysis of the frequency of each individual integer count across the set of track contact reports. Only those counts that occur frequently across the track are kept in the final countdown set for the track. Once a final countdown set C is defined, the final set of clocks $X_K$ can be determined as the collection of clocks with associated countdown sets that are complete subsets of the final track countdown set.

Each track T can be processed separately. At this point in the systems and methods of the present invention, each contact report CR has an observed PRI, a corresponding estimated clock X and its own associated countdown C with counts $c_i$. The number of counts $c_i$ in the countdown C can depend on the number of PRIs in the contact report. Various scenarios occur that produce different numbers of counts in the countdown for each contact report on a track. To name a few sample scenarios (list is not all inclusive):

(i) Contact report could be missing PRI values that were received in other track contact reports, either because values were skipped/missed in transmission due to error, or because not all PRIs are reported in each contact report by design;

(ii) Duplicate PRI values can be received in one contact report either by design or due to error;

(iii) Contact report could have extra PRI values that do not belong with track or radar type of the track; or, (iv) PRI values can be incorrect (too high, too low, shifted slightly) and produce invalid clocks/counts.

To account for the above scenarios (i.e. to remove outliers), following the clock estimation and contact report countdown calculation process, the systems and methods of the present invention can identify and eliminate invalid clocks and counts to determine one final set of valid clocks and an associated countdown for each track, see step 418 in in FIG. 8.

The first step in determining the final countdown (set of integer counts) and clocks for a given track T can be to find groups of track contact reports with similar clocks, as shown by block 420 in FIG. 8. Since each contact report CR has one clock, these groups are determined by arranging the set of all track clocks from track T into separate groups. The systems and methods of the present invention can combine all the clocks from all the track contact reports into one list. Duplicate clock values are removed from the combined list to produce a list of unique track clocks. The use of unique clocks, rather than the list of all clocks, reduces the number of calculations required in the method steps that follow. The set of unique clocks can be sorted numerically and then grouped.

In order to group the contact report CR clocks, two clocks $X_{k_1}$ and $X_{k_2}$ from a track T can be considered to be in the same group if (Equation 11):

$$|X_{k_1} - X_{k_2}| \le \varepsilon_X \text{ with } K_1 \ne K_2 \text{ and } 0 \le \varepsilon_X \le 1 \quad (11)$$

Where $\varepsilon_K$ can be a predetermined sensitivity value for the systems and methods of the present invention, which can be selected according to the needs of the operator, and can be based on factors such as number of CR's (the area of interest may be saturated), required analysis output, and similar such factors. Once the clock groupings are determined, the contact reports associated with the clocks in each grouping can be identified. The set of clocks from contact report groups can be used to determine a final list of countdowns for each clock group. The process of constructing this final clock group countdown list can be detailed in the flow chart in FIG. 9.

Figure 9:
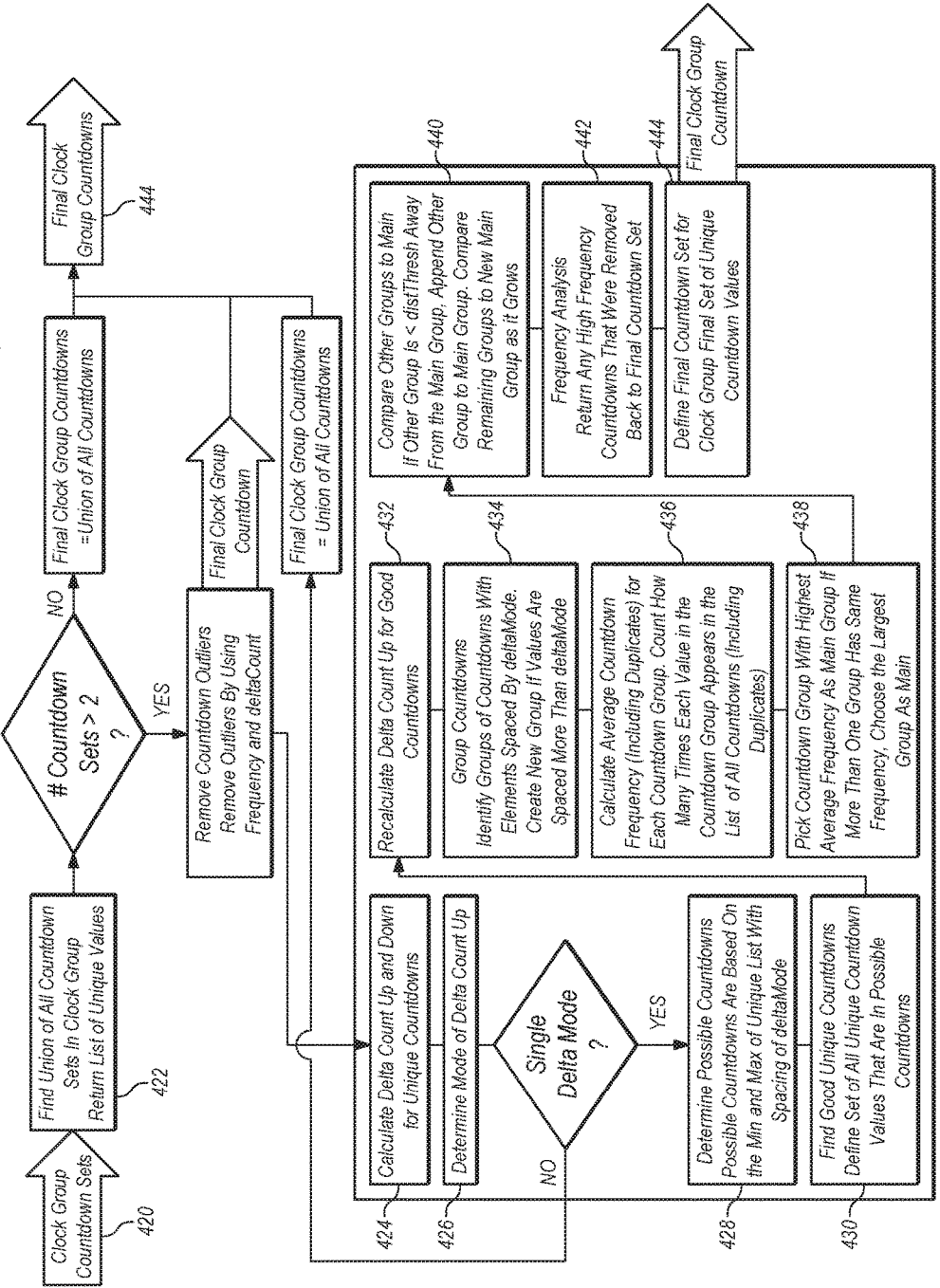
FIG. 9 is a block diagram, which illustrates steps that can be taken to find the final clocks and countdowns, using the results of FIG. 8.

Referring now to FIG. 9, for each clock grouping resulting from step 420, the systems and methods of the present invention can conduct the following steps to determine a final, refined, set of countdowns for the clock grouping. Initially, the systems and methods can find the union of all grouping contact report countdowns, to generate a list of unique values, or a list of countdowns that appears at least once in the grouping (block 422 in FIG. 9). Next, the minimum and maximum countdowns in resulting from step 422 can be defined.

Once the minimum and maximum counts are defined, the difference between each count and the subsequent count (delta count up) in the countdown C can be determined (block 424 in FIG. 9):

$$\Delta \text{countUp}_i = |c_i - c_{i+1}| \text{ for } i=1, \ldots, n+1$$

Next, the mode of ΔcountUp (Please note that in this paragraph the term "mode" is being used in the statistical sense and not as defined above for mode M, i.e. here, the term "mode" referd to the most common value from the set of all $\Delta \text{countUp}_i$ values) can be found. Note, that if there is a single most common delta up value, then the possible countdowns must be delineated by step 428 in FIG. 9. Otherwise, the final set of countdowns for the clock group is defined as the set resulting from the accomplishment of block 422 in FIG. 9.

To determine the set of "possible" counts for the clock group based on the ΔcountUp mode (step 428 in FIG. 9), the following sub-steps can be taken. First, the first occurrence of the ΔcountUp mode in the set of counts can be noted. The lower value associated with this first occurrence will be the start value, and this lower value is the first value added to the set of possible counts. Next, the methods can work down from the start value toward the minimum count in the countdown set (from step 422 above) by iteratively ΔcountUp subtracting the mode from the start value. Each resulting calculated value can be added to the set of possible counts. This process can be stopped once the minimum count or one (1) is reached, whichever occurs first. Finally, the methods can work up from the start value toward the maximum count in the countdown set (from step 424) by iteratively adding delta up mode from the start value. Each calculated value is added to the set of possible count. Stop once the maximum count value in the countdown set is reached.

As an example of the above, suppose that the union of all contact report counts and associated $\Delta \text{countUp}_i$ values resulting from step 428 is the following Table 3:

TABLE 3

| Count $c_i$ | 4 | 8 | 10 | 11 | 12 | 14 | 15 | 16 | 18 | 20 | 22 | 24 |
|---|---|---|---|---|---|---|---|---|---|---|---|---|
| $\Delta \text{countUp}_i$ | 4 | 2 | 1 | 1 | 2 | 1 | 1 | 2 | 2 | 2 | 2 | — |

Then, the mode, or the most $\Delta \text{countUp}_i$ common value is 2. The first $\Delta \text{countUp}_i$ occurrence of this value is associated with count "8" and "10". Therefore, for this example:

Mode $\Delta \text{countUp}_i$=2
Start Value=8
Minimum Count=4
Maximum Count=24

To determine the set of possible counts for this clock group, the systems and methods of the present invention can work from the start value down in increments of delta up mode until the minimum count (or 1) is reached (Table 4) and then up in increments of delta up mode until the maximum count is reached (Table 5).

TABLE 4

| Start Value | 8 | |
|---|---|---|
| −2 | 6 | |
| −2 | 4 | Minimum Count (stop) |

TABLE 5

| Start Value | 8 | |
|---|---|---|
| +2 | 10 | |
| +2 | 12 | |
| +2 | 14 | |
| +2 | 16 | |
| +2 | 18 | |
| +2 | 20 | |
| +2 | 22 | |
| +2 | 24 | Maximum Count (stop) |

Therefore, the set of possible counts (the countdown set) for this example clock group can then be defined as the sorted set of all calculated difference values in the two above tables. The set is listed in Table 6 below:

TABLE 6

| Possible Counts (step 428) | 4 | 6 | 8 | 10 | 12 | 14 | 16 | 18 | 20 | 22 | 24 |
|---|---|---|---|---|---|---|---|---|---|---|---|

Once the set of possible counts $c_i$ from 428 is determined, the set of counts from step 422 (original counts) that are appear in the list of possible counts can be identified. This subset of the original countdown can be defined as the good counts, as shown in step 430 in FIG. 9. The use of the set of possible counts in the example from (vi), step 428, helps to eliminate count values "11" and "15" that are likely outliers. However, the count value "6" is not in the set of original counts. Therefore, even though it is in the set of possible counts, it cannot be included in the set of "good" counts (Table 7).

TABLE 7

| | | | | | | | | | | | |
|---|---|---|---|---|---|---|---|---|---|---|---|
| Possible Count (step 428) | 4 | 6 | 8 | 10 | | 12 | 14 | | 16 | 18 | 20 | 22 | 24 |
| Original Counts (step 422) | 4 | | 8 | 10 | 11 | 12 | 14 | 15 | 16 | 18 | 20 | 22 | 24 |
| Good Counts (step 430) | 4 | | 8 | 10 | | 12 | 14 | | 16 | 18 | 20 | 22 | 24 |

Using the set of good counts (the third row in the previous table), the $\Delta countUp_i$ can be recalculated, as shown by step 432. The results are Table 8:

TABLE 8

| Good Counts (step 430) | 4 | 8 | 10 | 12 | 14 | 16 | 18 | 20 | 22 | 24 |
|---|---|---|---|---|---|---|---|---|---|---|
| $\Delta countUp_i$ (step 432) | 4 | 2 | 2 | 2 | 2 | 2 | 2 | 2 | 2 | — |

The new $\Delta countUp_i$ values as well as the original $\Delta countUp$ mode can be used to split the set of good counts into subsets. A new subset of counts is formed when two subsequent counts, from good counts, are more than $\Delta countUp$ mode away from each other. This is shown by step 434 in FIG. 9. See Table 9 below:

TABLE 9

| Good Counts (step 430) | 4 | 8 | 10 | 12 | 14 | 16 | 18 | 20 | 22 | 24 |
|---|---|---|---|---|---|---|---|---|---|---|
| Good Counts Subset 1 | 4 | | | | | | | | | |
| Good Counts Subset 2 | | 8 | 10 | 12 | 14 | 16 | 18 | 20 | 22 | 24 |

Continuing with the sub-steps for determining a final set of countdowns for a clock group:

(i) Find the average frequency across all CRs in a clock group (including duplicates) for each good count subset (Good Count subsets 1 and 2 above).

a. Count how many times (frequency) each value in the count subset appears in the list of all clock group counts (including duplicates).

b. Find the average frequency for each subset of good counts (FIG. 9, block 436).

c. Choose the good counts subset with the highest average frequency (step 438 in FIG. 9) as the main clock group counts (i.e. countdown set). If there is more than one subset with the same average frequency, choose the subset with the most count values as the main clock group counts (countdown set).

(ii) Once the above has occurred, compare all other subsets to the main countdown set to form a final set of counts for the clock group, as shown by block 440 in FIG. 9.

a. If the minimum (or maximum) count in one of the other subsets is within a predefined threshold of the maximum (or minimum) count of the main set, combine the sets and redefine the main set as the union of the two sets.

b. Continue this process until all other subsets have been compared to the growing main set.

(iii) Conduct frequency analysis on the final main countdown set (from xii, step 440) for the clock group (step 442 in FIG. 9).

a. If any other subset average frequency is greater than 0.5 times the number of clock group contact reports, include the contents of the associated other subset in the final countdown set.

b. Use the frequency of a countdown across the track to remove low frequency outliers from the beginning and end of the final countdown set.

(iv) Define the final countdown set for the clock group as the result of step 442, and as shown by block 444 in FIG. 9.

Using the results from step 444, and referring back to FIG. 8, the last step in determining the final countdown set C and final clocks $X_K$ for a given track is to compare and combine the clock group countdown sets for the set of clock groupings. The comparison of the countdown sets, rather than blind combination, helps to identify invalid clocks and to determine the most likely countdown set of for the track. If the estimated clocks are correct, then the clock group countdown sets should be very similar. If a clock is invalid, the associated countdown will not be similar to the other clock group countdowns. This final step is illustrated by block 450 in FIG. 8.

Referring back to FIG. 8, the systems and methods of the present invention identifies a "master clock group" for the track and compares all other clock groups to it. The master clock group is determined by the following steps:

(i) Determine the number of contact reports in each clock group;

(ii) Find the maximum number of contact reports in a clock group (block 448);

(iii) Identify which clock grouping(s) contains (contain) this maximum number of contact reports. The clock groupings fitting this criteria can be defined as potential master clock groups, as shown by block 454;

(iv) Determine the number of counts in each of the potential master clock groups;

(v) Find the maximum number of counts in a potential master clock group; and, (vi) Define the master clock group as the first of the potential master clock groups with a countdown set length equal to the maximum number of counts, as shown by block 454 of FIG. 9.

As shown by block 450 in FIG. 8, the systems and methods of the present invention can compare the remaining, other, clock group countdown sets to the defined master clock group countdown set. The comparison can be conducted iteratively by repeating the process with all the other groups. The goal can be to identify which of the other countdown sets is (1) a subset of the master group countdown set and (2) is extremely similar to the master group countdown set. If one of the other clock group countdown sets meets this criterion then the associated clocks are appended to the master clock group clock list. To do this, one can define:

Master Group Countdown Set=$C_0$

Other Group Countdown Sets=$C_s$, with s=1 ... S.

As depicted by block 456 in FIG. 8, the Jaccard Similarity Index can be used to evaluate how similar two sets are. This value helps identify the cases when one countdown set may be a subset of the master countdown group, but does not contain a significant number of counts. In these cases, the other countdown set is a lot smaller and not considered to be very similar to the master group. If two sets are exactly the same, then $J(C_0, C_s)=1$. A low index value indicates the sets do not have very many elements in common and should not be combined, i.e. the associated clock should not be included in the final set of final track clocks. The systems and methods of the present invention can take the following steps for each grouping:

(i) If $C_s \subseteq C_0$ then move to the next group I_1 (block 458);
(ii) If $C_s \subseteq C_0$ then calculate the Jaccard Similarity Index (block 460);

$$J(C_0, C_s) = \frac{|C_0 \cap C_s|}{|C_0 \cup C_s|}$$

and, (iii) If $J(C_0, C_s) \geq \varepsilon_J$ with $0 \leq \varepsilon_J \leq 1$ (block 462), then append the other group clocks to the master group (clocks).

Block 438 in FIG. 8 and reference character 80 of FIG. 3 can depict the end result of the sub-steps for modeling track step 40, through step 462. At the end of this process, each track will have one set of clocks and an associated countdown set.

C. Grouping of Tracks with Matching Countdowns

Figure 10:
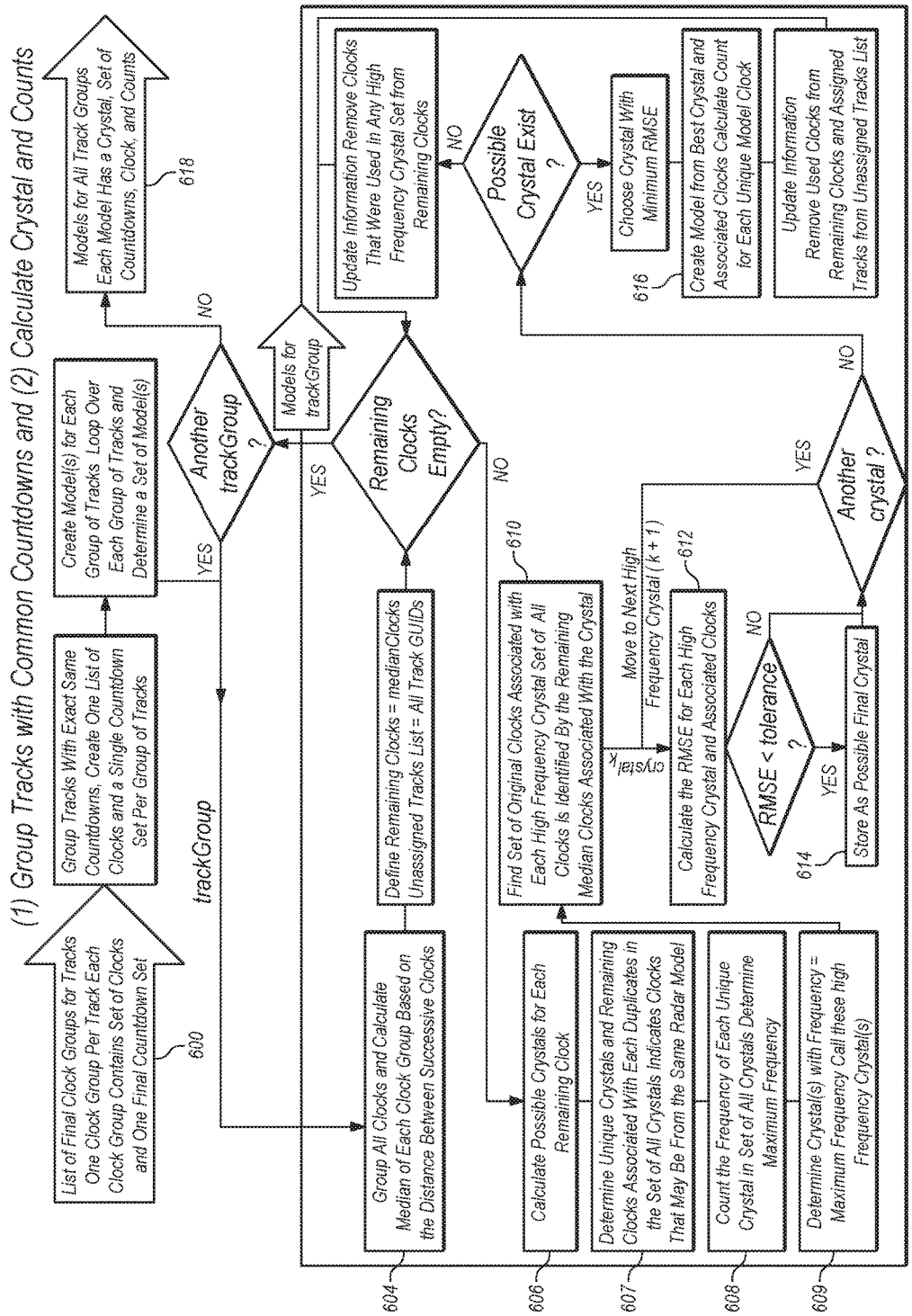
FIG. 10 is a block diagram, which illustrates steps that can be taken to find crystal "b" for the radar-of-interest, and which demonstrates the splitting step of FIG. 2.

At this point in the systems and methods of the present invention according to several embodiments, each track T has a set of clocks $X_i$, and Countdowns $C_i$ for a contract report $CR_i$, which correspond to a received $PRI_i$ from return emission 14. Referring now to FIGS. 3 and 10, grouping step 50 can be accomplished whereby radar models are formed from groups of similar tracks. Calculation of the final two radar model parameters, crystal and mode(s), requires the presence of multiple clocks $X_i$ associated with a single countdown set C. In most cases, this will not occur when only one track T is used. Therefore, the use of many tracks is necessary, and the tracks $T_1$ through $T_M$ can be grouped into groups $G_1$ through $G_p$ (See FIG. 3).

The final countdown set for each track $T_1$ through $T_M$ can be used to compare tracks. The invention systems and methods of the present invention can identify and combine tracks with identical countdown sets, regardless of their relative geographic location, to form groups $G_1$ through $G_p$ (90 in FIG. 3) of tracks T. A single list of clocks for each track group is formed by combining all the clocks from all the tracks in the group. Each group of tracks is defined by this comprehensive list of clocks and the single set of integer countdowns. The result is illustrated as groups $G_1$ through $G_p$, as indicated by reference character 90 in FIG. 3

It is known that different types of radar can use the same countdown set and similar clocks to produce the PRIs to be transmitted as pulses. The remaining parameters, crystal b and mode(s) M, are used to distinguish one radar type from another. The groups of tracks with identical countdowns can contain pulses that were transmitted by different types of radar. As such, these groups of tracks may need to be split, as shown by step 60 in FIGS. 2 and 3, to produce more robust radar parameter models complete with estimations of radar clock, countdowns, crystal, and mode. Any track whose countdown set is not identical to that of another track in the processing batch can be split in its own single track group. No track is eliminated from the systems and methods of the present invention at any time. The splitting step 60 is described more fully below.

D. Splitting of Groups

Referring now to FIGS. 2, 3 and 10, the final two unknown radar model parameters that can be estimated by the invention systems and methods of the present invention are the crystal b and mode M. These values are derived from the clock X and can help to further distinguish types of radars-of-interest 16 types from one another. Each type of radar uses a single crystal (as defined above) value for all transmissions. The mode(s) are the integers that multiply the crystal and generate different clocks for the radar to use (which were previously estimated). Some types of radar can use multiple modes, which can produce multiple clocks. When multiplied by the countdown set, these various mode values can produce different PRIs that have been observed in pulses 14.

The groups $G_1$ through $G_p$ of tracks formed by the systems and methods of the present invention can serve as the input to the splitting step 60. Each group 90 of tracks is processed separately by the invention systems and methods of the present invention. The goal of this step 60 (FIG. 2) can be to create a set of initial models 100 or a single model for each group of tracks. Specifically, the systems and methods of the present invention can estimate possible crystal values "b" for various subsets of the group tracks that most accurately describe all the tracks in the group. The crystals can be chosen as the real values that work with the set of group clocks resulting from grouping step 50 to produce mode values as close to integers as possible, using Equations (4) and (5). Each individual crystal "b" can be calculated by the systems 10 and methods 20 of the present invention, and the associated subset of tracks and their clocks, can be used to calculate a set of integer modes. The individual crystals, and the associated subset of tracks, track clocks, countdowns, and derived modes, can form a new initial radar model 100 with all identifying parameters (crystal, mode, clock and countdown) defined.

The process of creating models for each group of tracks is detailed in the flow chart in FIG. 10. Each group 90 of tracks 80 can have a list of clocks $X_i$ and a single set (the countdown C) of integer counts $c_i$. The systems and methods of the present invention can conduct the following steps to estimate crystals and associated radar modes for each group:

(i) Sort the list of all clocks to $X_1, X_2, \ldots, X_K$ produce:

(ii) As shown by step 604 in FIG. 10, group the clocks based on the distance between successive clocks using Equation (11), using the same predetermined threshold $0 \le \varepsilon_c \le 1$. For example, ClockGroup$_1$=$X_1,X_2,X_3$ ClockGroup$_2$=$X_4,X_5$ ClockGroup$_3$={$X_6$} ... ClockGroup$_S$={$X_{K-2},X_{K-1},X_K$}

(iii) Calculate the median of each clock group. This median values can be used to establish a set of median clocks {$\overline{X}_1, \overline{X}_2, \ldots, \overline{X}_S$} with $\overline{X}_s$=median(ClockGroup$_s$)

(iv) Calculate all possible crystals (step 606) for each clock group using the median clock values, using Eq. (4), i.e., $$\text{crystal} = \frac{\text{clock}}{\text{mode}} \Rightarrow b = \frac{X}{M}$$

At this point, the clock values (median clocks) $\overline{X}_s$ are known from (iii), step 604 in FIG. 10, and the unknown mode $M_j$ values, can be selected from the set of positive integers. The set B of approximate crystal values, b, for a set of clock values can be determined using any finite subset of the positive integers. One can define the mode ($M_j$) associated with a clock ($\overline{X}_s$) and crystal ($b_{s,j}$)

$M_j \in [A,B]$ with $A,B \in \mathbb{Z}^+$

Then, the set of all possible crystals for each median clock X in (iii) can be defined as $$b_{s,j} = \frac{X_s}{M_j} \text{ with } s = 1, \ldots, S \text{ and } j = 1, \ldots, m \quad (12)$$

The number of unique clocks and the number of unique crystals may or may not be the same. Two different clocks and modes can produce the same crystal value.

Combine all possible crystals, ($b_{s,j}$), into one comprehensive list of all crystals.

B={$b11, \ldots, b_{1j}, b_{21}, \ldots, b_{2j}, \ldots, b_{s1}, \ldots, b_{sj}$} where the first subscript corresponds to the median clock $\overline{X}_s$ used in (12) and the second subscript corresponds to the mode $M_j$ used in (12) to compute the crystal value ($b_{s,j}$).

(v) Remove duplicate values from the set of all crystals and define the set of unique crystals. This is illustrated by step 607 in FIG. 10. If the any subset of tracks T from group G used the same type of radar 16, then they should use the same crystal value. As such, the set of all crystals should contain some very similar, if not identical, values.

(vi) Count the frequency of each unique crystal in the set of all crystals (block 608 in FIG. 10).

(vii) Determine the maximum crystal frequency, from the frequencies in step 609, and determine which crystals occur with this maximum frequency. This subset of high frequency crystals can be defined as a new set, $\overline{B}$:

$\overline{B}=\{\overline{b}_1, \overline{b}_2, \ldots, \overline{b}_t\}$ with all $\overline{b}_t \in B$ (viii) As depicted by block 610, find the set of median clocks that produced (using Equation 12) each of the high frequency crystals.

(ix) Use the median clocks to determine the original clocks, from the clock groups in (ii), step 604, which are associated with each of the high frequency crystals from (viii), step 610 in FIG. 10.

(x) Calculate the root mean squared error (RMSE) for each high frequency crystal and associated original clocks. This is depicted in step 612 in FIG. 10. The goal of this step is to determine the error between the real mode value calculated in (5) and the closest integer. For each high frequency crystal, $\overline{b}_t$, the RMSE is calculated using the set of associated original clocks as:

$$RMSE(\overline{b}_t) = \sqrt{\frac{\sum_{i=n_0}^{n_1}\left(\frac{X_i}{\overline{b}_t} - \text{round}\left(\frac{X_i}{\overline{b}_t}\right)\right)^2}{n_1 - n_0 + 1}} \quad (13)$$

with $X_i \in \{X_k\}$ and $1 \le n_0 \le n_1 \le K$

For example, suppose high frequency crystal $\overline{b}_1$ is associated with median clocks {$X_1, X_2$}. Therefore, from (ii), step 604, crystal $b_1$ is associated with original clocks crystal$_0$ is associated with original clocks {$X_1, X_2, X_3, X_4, X_5$}. Then, $$RMSE(\overline{b}_1) = \sqrt{\frac{\left(\frac{X_i}{\overline{b}_t} - \text{round}\left(\frac{X_i}{\overline{b}_t}\right)\right)^2 + \ldots + \left(\frac{X_5}{\overline{b}_t} - \text{round}\left(\frac{X_5}{\overline{b}_t}\right)\right)^2}{5}} \quad (14)$$

(xi) If RMSE($\overline{b}_t$) is small enough (i.e. less than a predetermined tolerance threshold set by the operator, then keep $\overline{b}_t$ as a possible crystal for the group G of tracks.

(xii) If no RMSE($\overline{b}_t$) passed the tolerance threshold test, remove all the clocks associated with any of the high frequency crystal values from consideration and start the process over at (ii), step 604, using any remaining clocks. If no clocks remain after removal, create a model using default values for all unassigned clocks and their tracks. These default models will consist of one track each.

(xiii) If any RMSE($\overline{b}_t$) passed the tolerance threshold test, determine the $\overline{b}_t$ associated with the RMSE($\overline{b}_t$) minimum value and store as a possible final crystal value, as shown by block 614.

(xiv) Create a new radar parameter model using the crystal from (xiv), block 616:

a. Calculate a mode $M_j$ for each median clock $\overline{X}_i$ associated with the best crystal $\overline{b}_t$:

$$M_j = \text{round}\left(\frac{\overline{X}_i}{\overline{b}_t}\right) \text{ for } i = n_0, \ldots, n_1$$

b. Define new radar model with the following parameters:
  i. Crystal=$\bar{b}_t$
  ii. Modes=Set of all unique modes, $M_j$
  iii. Clock=Set of median clocks $\overline{X}_i$ associated with $\bar{b}_t$.
  iv. Countdowns=countdown set for group of tracks
c. Store model and all associated tracks in database.
(xv) Remove all clocks used in model (in (xv) see also block 616), update unassigned tracks list to reflect tracks in the group that were assigned to new model, and start the process over at (ii) using any remaining clocks.
(xvi) Stop the process described above when all tracks T in the group 80 have been assigned to a model. The result is a "first draft" model (initial model 100 in FIG. 3) is depicted in block 618 in FIG. 10.

The splitting step 60 step detailed above can be repeated for each group G of tracks T formed by the grouping step 50 of the systems and methods of the present invention. The systems and methods of the present invention can be biased to combine as many tracks in a track group as possible into one model (containing one crystal). However, the iterative process can determine how many models are appropriate for each group of tracks with the operator having to impose an external bias. The groups can result in as few as one initial model 100 or as many initial models 100 as tracks in the group (i.e. each track in the group produces its own model).

E. Merging of Models

Referring now to FIGS. 2-3 and 11-14, the invention systems and methods of the present invention can include the step of merging the initial models 100 into final models 110, as illustrated by merging step 70 in FIG. 2. Merging step 70 can operate to combine similar/duplicate radar models from a large list of radar parameter models. More specifically, the systems and methods can allow for the merger of radars based on return emissions 14 that can be received in real time by comparing to information previously stored and recorded in database 19 (See FIG. 1). As explained above, the contact reports received by the invention systems and methods of the present invention can be input by site users that are remote from each other. The separate batches and threads do not share or compare data during processing, to speed up processing. As a result, there can often be similar or duplicate radar models of the same radar-of-interest 16 produced by the systems and methods of the present invention and saved to a model table at different processing times. These duplicate models can be combined by periodically merging the models, using step 70 to yield the final model 110 shown in FIG. 3. An overview of the process of merging radar models is detailed in FIG. 11.

Each initial model Md (100 in FIG. 3) can have a crystal b, set of integer countdowns $C_i$ clocks $X_i$ and modes $M_j$. There will be some models that have well-defined, specific parameters, and there will be others that have default crystal and mode values. The well-defined models are constructed from groups G of tracks T and various clocks X. These default models are formed when a single track T or a single median clock X can be used to create the initial model Md. These two types of models (default and well-defined) can be merged by different algorithms. The model merger can accomplish four phases of merging step 70 in order to produce a final list of comprehensive radar models. The goal can be to quickly and efficiently identify which models are similar enough, or are exact duplications, to be combined. The systems and methods of the present invention forms groups of similar models and automatically combines their information to form a final refined model (or final refined models) for each group. Final model 110 is shown in FIG.

3. Phases one through three of model merging step 70 can be illustrated in FIGS. 11 and 12.

1. Merger—Phase 1

Figure 11:
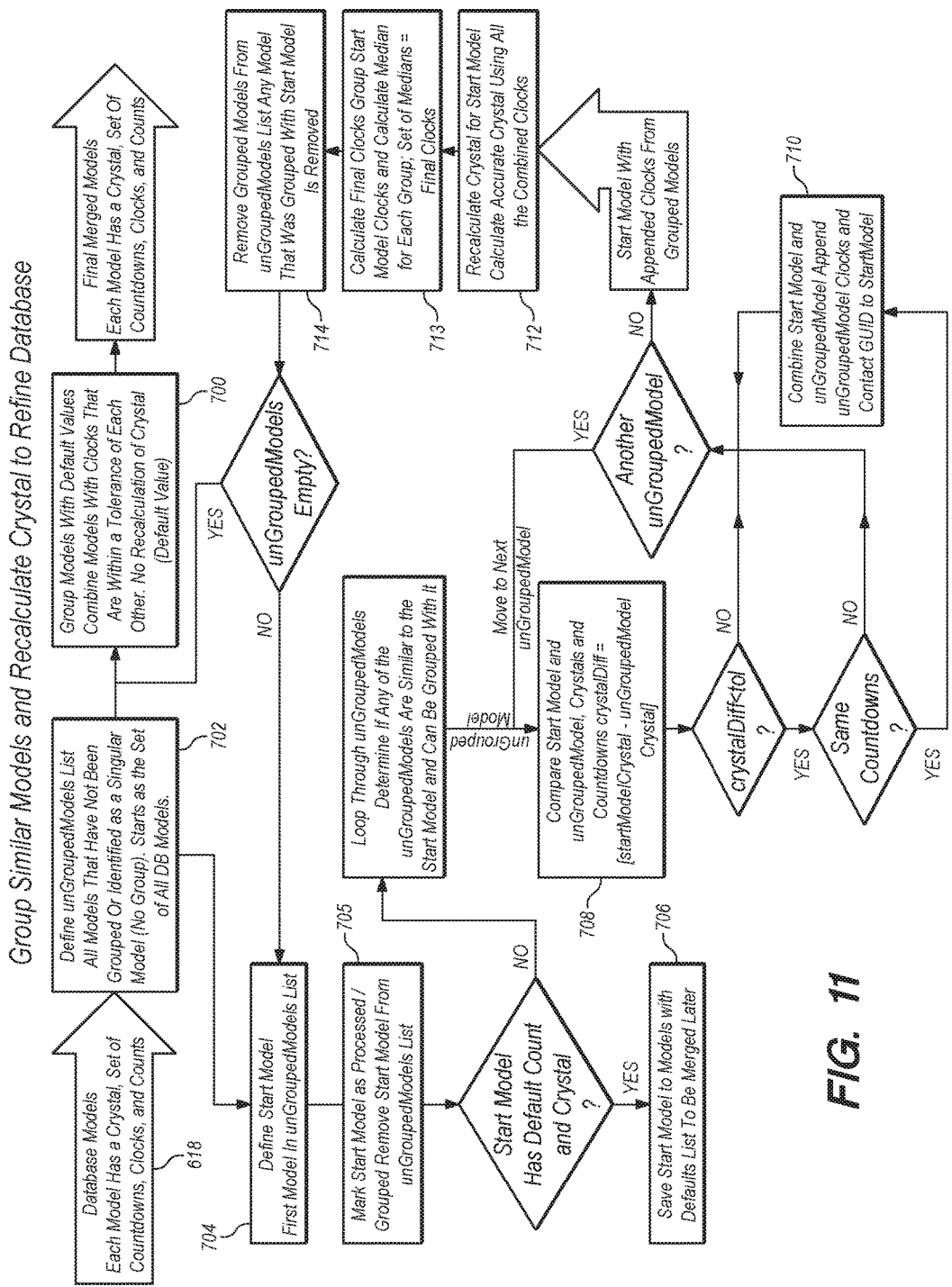
FIG. 11 is a block diagram, which illustrates the splitting step of FIG. 2 in greater detail.

In the first phase of the merging step 70, the systems and methods of the present invention separates the default radar models, step 700 (i.e. models with default mode and crystal values) from the complex radar models (the terms complex and well-defined are used interchangeably herein). Then, the systems and methods of the present invention merge similar complex radar models. To do so, the following steps are implemented:

(i) Start with all radar models (complex and default) as "ungrouped models", step 702 in FIG. 11;
(ii) Define start model Md as the first models in ungrouped models list (FIG. 11, steps 704 and 705);
(iii) If start model $Md_t$ has default mode M and crystal b and only one clock X (defined as a default model);
  a. Add the $Md_t$ to the default models list to be processed in the next phase of merging (step 706);
  b. Remove $Md_t$ from ungrouped models list;
  c. Return to step (ii), steps 704 and 705 with updated ungrouped models list;
(iv) If start model $Md_t$ is not a default model;
  a. Compare remaining models $Md_t$ in the ungrouped models list to find model that are similar to the start model $Md_t$ (forming a group of models with start model $Md_t$ as the "key" or main model), as shown by step 708, any models added to the group can be deems as sub-models;
  b. Compare start model $Md_t$ to each ungrouped $model_i$.
  c. If ungrouped $model_i$ crystal is equal to the default crystal value, skip ungrouped $model_i$,
  d. Otherwise, if
|start model crystal b−ungrouped $model_i$ crystal b|≤tol, where tol is a predetermined, user-defined tolerance similar to ε, and
start model countdown set C=ungrouped $model_i$ countdown set C (i.e., if the ungrouped model has the same countdowns and sufficiently same crystal value),
Then add ungrouped $model_i$ to start model group and append ungrouped $model_i$ clocks to start model clocks X (step 710).
  e. Continue steps b and c until the previously-defined start model from step 704 is compared to each ungrouped $model_i$ in the list of defined ungrouped models from step 702, and a group of similar models, with start model $Md_t$ as the key model, has been formed.
(v) If any models were matched with the start model $Md_t$ (i.e. start model group contains other models), an accurate crystal value for the model group will be calculated using the combined list of clocks from all models in the model group (step 712 in FIG. 11). To do so, conduct an iterative broad search over a possible range of crystals, [P, Q], where P and Q are real numbers that can be defined by the user, at a desired granularity to find the crystal, b, that satisfies Equation (15):

$$RMSE(b) = \min_t(RMSE(b_t)) = \min_t\left(\sqrt{\frac{\sum_{i=1}^{N}\left(\left(\frac{X_i}{b_t}\right) - \text{round}\left(\frac{X_i}{b_t}\right)\right)^2}{N}}\right) \quad (15)$$

with $b_t \in [P, Q] \subset \mathbb{R}$

Where $\{X_1, \ldots, X_{K_1}, \ldots, X_{K_2}, \ldots, X_N\}$ is the set of combined clocks from start model and other models in the group.

(vi) Calculate set of median clocks from the combined list of clocks $\{X_1, \ldots, X_{K_1}, \ldots, X_{K_2}, \ldots, X_N\}$ a. Group list of model clocks based on the distance between successive clocks using Equation (11). For example, ClockGroup$_1$={$X_1,X_2,X_3$}ClockGroup$_2$={$X_4,X_5$}

ClockGroup$_3$={$X_6$}ClockGroup$_{NN}$={$X_{N-2},X_{N-1},X_N$} b. Calculate median of each clock group.

$\{X_1, X_2, \ldots, X_{NN}\}$ where $X_i$=median(ClockGroup$_i$)

(vii) Calculate mode(s) associated with the crystal in (v) and each median clock in (vi) using Equation (16):

$$M_{NN} = \frac{X_{NN}}{b} \quad (16)$$

(viii) Define final (merged) model using the crystal from (v), the set of median clocks $\{X_1, X_2, \ldots, X_{NN}\}$ from (vi), and the set of modes $\{M_{NN}\}$ from (vii).

(ix) Remove start model and all ungrouped model$_i$ merged with it from ungrouped models list, as shown by step 714.

(x) If ungrouped models list is not empty, return to step (ii), step 704, using the updated ungrouped models list.

(xi) If the ungrouped models list is empty, move on to phase two of merging.

Figure 12A:
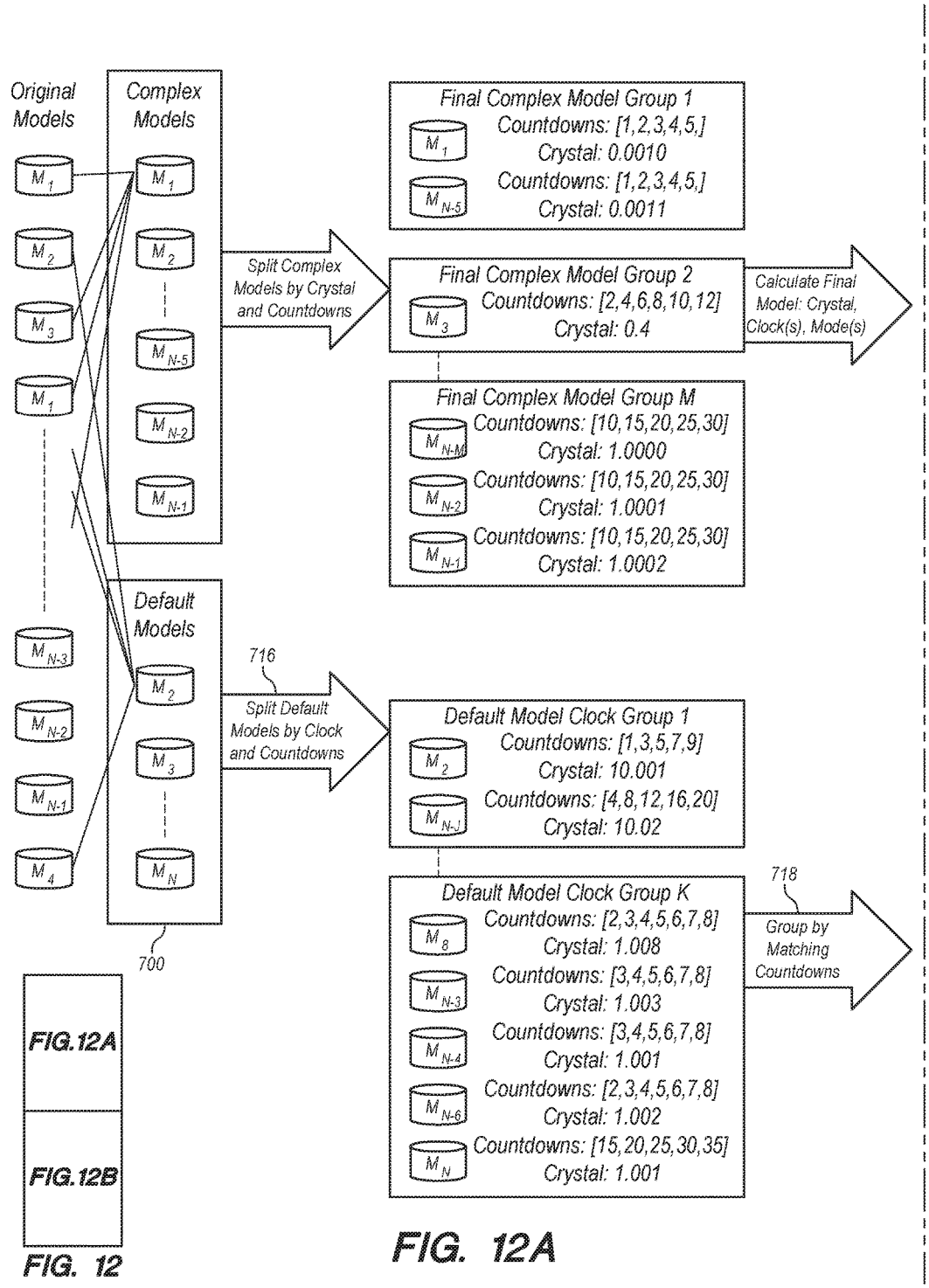
FIG. 12A is a block diagram, which illustrates the initial portion of the overall merging step of FIG. 2 in greater detail.
Figure 12B:
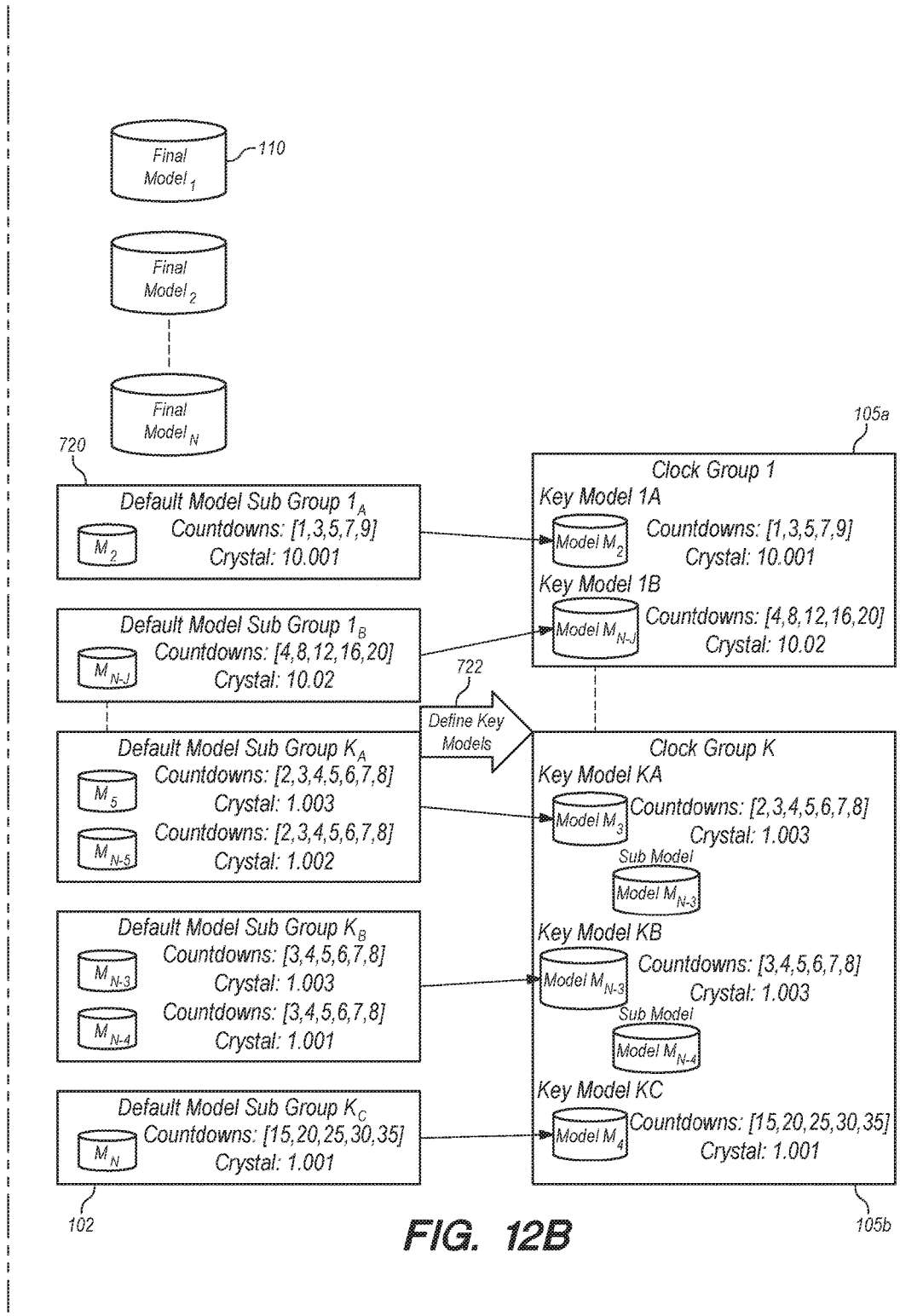
FIG. 12B is a block diagram, which illustrates the latter portion of the overall merging step of FIG. 2 in greater detail.

The result is final model 110 in FIG. 12.

2. Merger—Phase 2

In phase one of the merging step 70, the well-defined models were merged. The second phase of merging step 70 can operate on the set of models with default parameter values (700, FIGS. 11-12). These models were identified in phase one (above) and labeled "default models". Every default model can have the same crystal and mode value M, which is equal to the default values. The clock X and set of integer counts C are the only parameters that vary amongst the set of default models. The clocks, X, and countdown sets, C, can be used for comparison between the models. The clocks and set of integer counts of different default models can be similar. Referring now to FIG. 12, the following steps can be accomplished to merge default models with similar clocks and matching countdowns (within a threshold chosen by the user):

(i) Create a sorted list of all clocks, combining the single clock from each default model into one comprehensive list of all default model clocks (Step 716);

(ii) Group the sorted list of all clocks based on the distance between successive clocks using (11), as shown by Step 718. Two successive clocks are assigned to the same clock group if they are significantly close, which is determined by the user defined threshold value $\varepsilon_X$.

For example (as in vii above), the following clock groups could be formed from the list:

ClockGroup$_1$={$X_1,X_2,X_3$}ClockGroup$_2$={$X_4,X_5$}

ClockGroup$_3$={$X_6$}ClockGroup$_{NN}$={$X_{N-2},X_{N-1},X_N$}

(iii) Determine which default models belong to each clock group. Each default model has a single clock. In this step a default model is assigned to a clock group if the clock group contains its clock;

(iv) For each clock group, consisting of default models with similar clocks, find models with same exact countdowns and form sub-groups of models. The sub-groups 102 and step 720 are shown in FIG. 12;

a. Start with all clock group models as "ungrouped models"; and, b. Define start model=first model in ungrouped models list.

Compare start model to each ungroupedmodel$_i$. If start-model countdown set=ungroupedmodel$_i$ countdown set, then add ungrouped MODEL$_i$ to the start model group and append ungrouped MODEL$_i$ clocks to start model clocks. NOTE: These steps are the methods saying that these models are essentially duplicates of each other. Accomplish these actions for the remaining models in the ungrouped models list.

c. Once the start model is compared to each ungrouped model$_i$ and a group of similar models, with start model as the key model, has been formed. Recalculate final start model clock as the median of the list of all clocks from the start model and from the merged models.

d. Remove start model and all ungrouped model$_i$ merged with it from ungrouped models list.

e. If ungrouped models list is not empty, return to step 720 using the updated ungrouped models list and create a new sub-group of models.

f. If the ungrouped models list is empty, move on to the next clock group and repeat steps until all clock groups are processed and split into sub-groups 102 of models with matching countdowns.

The result of this phase of merging is groups of key default model sets $K_{ij}$ (105a and 105b in FIG. 12), where each set consists of models with similar clocks and matching countdowns. The models in each set are essentially duplicates of each other, with minor variations in clock values. These new default model groups can be sent to the third phase of merging step 70.

3. Merger—Phase 3

Figure 13:
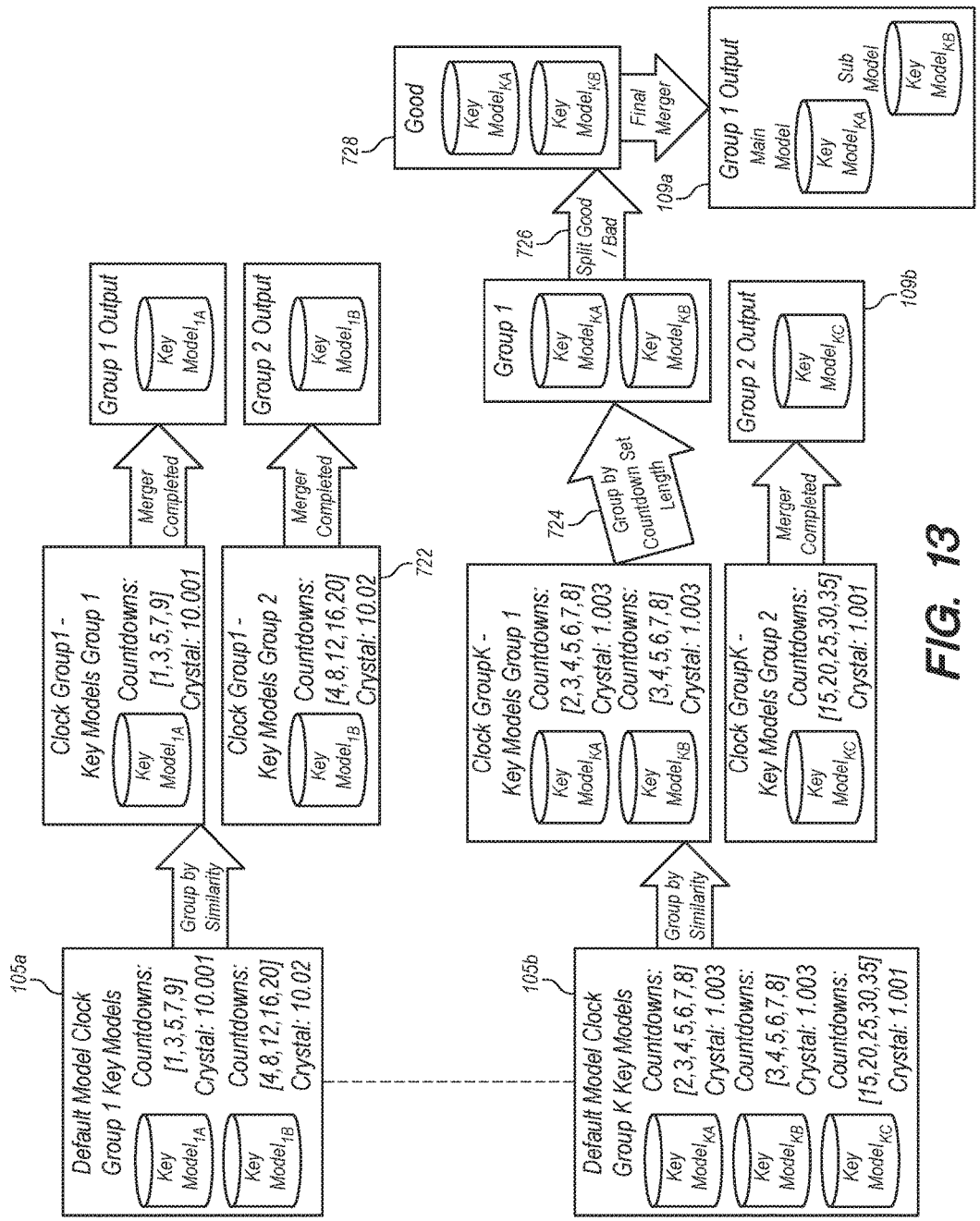
FIG. 13 is a block diagram, which illustrates the merging step for the default models of FIG. 12 in greater detail.

The third phase of model merging step 70 can use the sub-groups 105a, 150b of duplicate default key models defined in phase two as input. In this phase, the systems and methods of the present invention can evaluate the similarity between the countdowns of each of the default model sub-groups within each clock group, from phase two, in an attempt to further combine them. A key model is defined for group 105 as the first model in the group 105 (formerly the start model in phase two). The key models are compared to determine if any of the other clock group key models are similar enough to be merged. In this phase, the systems and methods of the present invention does not require the countdown sets to be identical, but very similar, for models to be merged. As shown in FIG. 13, the following steps are implemented on each set of clock group models $K_{ij}$:

(i) Define key model for each sub-group of models (within the clock group). Step 722. This can be defined as the first model in the group.

(ii) For each key model 105 in the list determine the following:

a. Length of countdown set b. Number of sub-models 102 (i.e. models already merged with model 105 in the merger phase two process)

c. Minimum and maximum count values d. Difference between minimum and maximum count values (iii) Group models by similarity a. Start with the set of all key models as "ungrouped models"={UM$_i$} b. Define start model=first model=SM in ungrouped models list.
c. Repeat the two steps below for the remaining ungrouped models=$\{UM_i\}\backslash SM$
   i. Compare start model (SM) to each ungrouped model $UM_i$
   ii. If the intersection of the SM countdown set, $C_{SM}$, and the ungrouped model countdown set, $C_{UMi}$, is not empty, then add $UM_i$ to the start model group (which is the growing set of all models merged with the start model from phase two and phase 3) and append al the $UM_i$ clocks to the set of start model clocks.
d. Once the start model, SM, is compared to each ungrouped model, $UM_i$, and all ungrouped models that are similar to the start model have been identified and added to the start model group, both the start model and the set of similar ungrouped models are removed from the original set of ungrouped models, $\{UM_i\}$, from (a). This will prevent them from being matched to any of the remaining ungrouped models as the processing continues.
e. If the ungrouped models list is not empty, after the removal of the models in step (d), return to step (b) using the updated ungrouped models list and continue the process until all ungrouped models have been evaluated for merging.
f. If the ungrouped models list is empty, move on to step (iv).

Each group of key models with intersecting countdowns (determined in (ii) above) will be processed and merged separately. Steps (iv)-(vii) below can be performed on each subset of key models:

(iv) Group key models by their countdown set length (step 724).
   a. Combine set of all countdown length values into one list of unique values.
   b. Group list of countdown length values—separating consecutive values that are far apart.
   c. Identify which key models have countdown length values in each of the groups.

Each group of key models with similar countdown set lengths (determined in iv) will be processed and merged separately. Steps (v)-(vii) are performed on each group of models with similar countdown lengths:

(v) Split models into "good" and "bad" models, as shown by step 726 in FIG. 13. A good model (box 728 in FIG. 13) is one where the countdown set C does not skip any expected values between the minimum and maximum count value with step size equal to the countdown step mode. A bad model (not shown in FIG. 13) is one where a countdown set C is missing one or more expected value between the minimum and maximum count with step size equal to the countdown step mode.

(vi) Group good models by distance between minimum and maximum countdowns, calculated in (i), step 722.

(vii) Each subset of good models from the group of good models with similar distances between minimum and maximum countdowns is sent to the final default model merger.
   a. Calculate average number of countdowns across all models in subset.
   b. Identify which models have number of countdowns less than or equal to the average.
   c. Merge the models that satisfy (b) first, i.e., that have a number of countdowns leas than or equal to the average. The result of this merge is shown by reference characters 109a and 109b in FIG. 13.

d. Determine order to evaluate models in (c) based on number of countdowns. Start with highest number of countdowns (equal to or less than average) and work down.
   i. Compare each unmerged model, in order of largest to smallest countdown set, to the growing set of merged models. The merged models list will consist of sets of models that have been identified as being "similar enough" to be combined. Each set of merged models will have a key merged model which will be used for comparison with other, unmerged models.
   ii. Compare all key merged models to the unmerged model with the highest number of countdowns (equal to or less than average).
   iii. Identify any key merged model that contains all of the countdown values in the subject model countdown set. Label these as possible matches.
   iv. Identify any possible matches that have the same first countdown value as the unmerged model.
   v. If any possible match has the same first countdown value, merge the subject model with it. If no possible match has the same first countdown value, merge the subject model with the possible match that has the most sub-models (set of models that have been merged with it).
   vi. Update the list of merged models and associated key merged models to reflect the information from the subject model.
   vii. If there are no possible matches for the subject model, then add it to the set of merged models as a new key model with no sub-models.
   viii. Continue steps (i-vii) for all unmerged models until they have been assigned to a set of merged models or identified as a model without any similar sub-models.
e. Evaluate and merge all remaining unmerged models with countdown sets larger than the average number of countdowns.
   i. Compare each unmerged model to the set of key merged models from (d), 109a, 109b in FIG. 13.
   ii. Identify all key merged models with the same start countdown value as the subject unmerged model. Label these as possible matches.
   iii. Identify the possible match with the most sub-models.
   iv. Add the subject unmerged model to the list of sub-models associated with the possible match with the most sub-models. This will assigned the unmerged model to the key merged model, dropping any "extra" countdown values that are not included in the key model countdown set.
   v. If there are no possible matches for the subject model, then add it to the set of merged models as a new key model with no sub-models.

Once all the current clock group key models have been combined, producing subsets of key models each with a main (or key) model and associated sub-models, the final step in phase three is to compare all the current clock group "bad models" to the new clock group key model subsets. The systems and methods of the present invention evaluate each "bad model" to determine if the associated countdowns are a complete subset of any of the final clock group key model subsets. Step (ix) is performed on the set of bad models for each clock group:

(viii) Compare each "bad model" for the clock group to the set of final merged clock group models produced in (viii).
  a. Define a new final key model for each clock group key model subset.
  b. Calculate the similarity between the countdown set associated with each bad model and the countdown set associated with each final key model using the Jaccard Similarity Index (defined above).
  c. If any final key model countdown set is similar enough (i.e. Jaccard index is greater than a defined threshold), then assign the bad model to the most similar final key model group.
  d. If no final key model countdown is similar enough to the bad model, then add the bad model to the set of final merged models for the clock group as a new key model with no sub-models.

The third phase of model merging, detailed above, used the groups of duplicate default models defined in phase two as input. A key default model was defined for each of the input groups. These key models were further combined to create subsets of key models with similar clocks and similar countdowns. The output of the third phase of merging is subsets of the key models.

4. Merger—Phase 4

Figure 14:
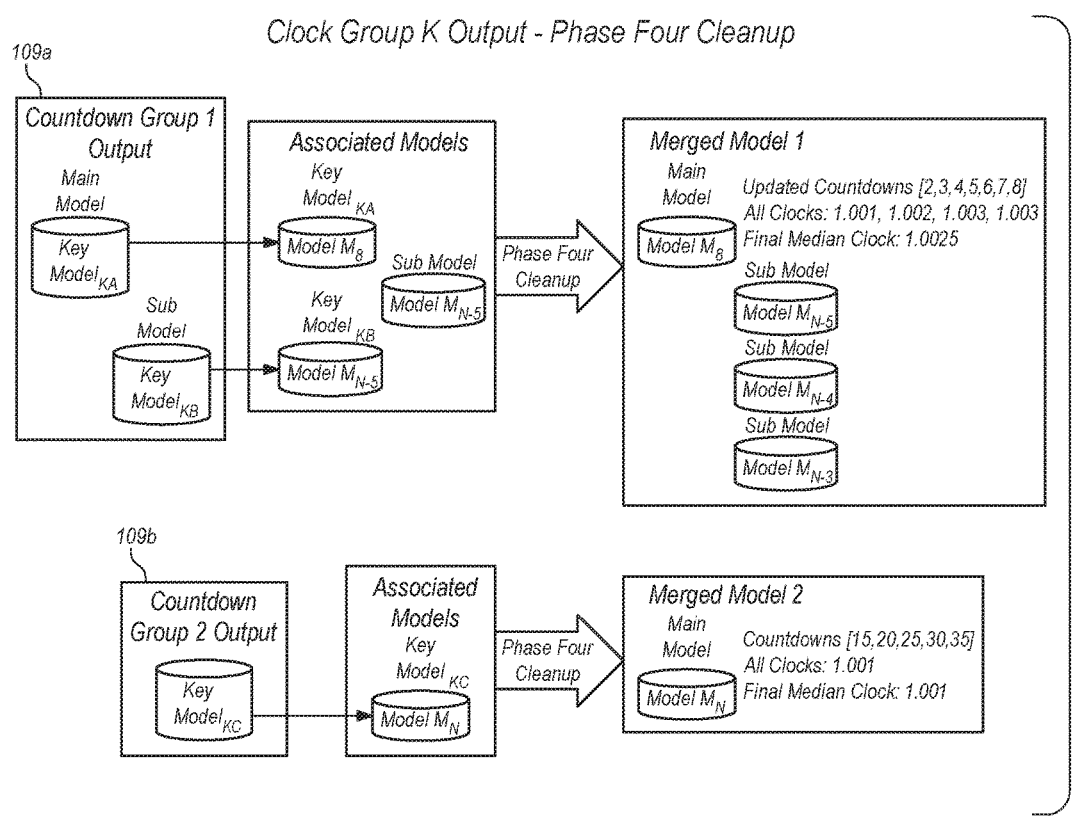
FIG. 14 is a block diagram, which illustrates phase four of the merging step of FIG. 12 in greater detail is a block diagram.
Figure 15:
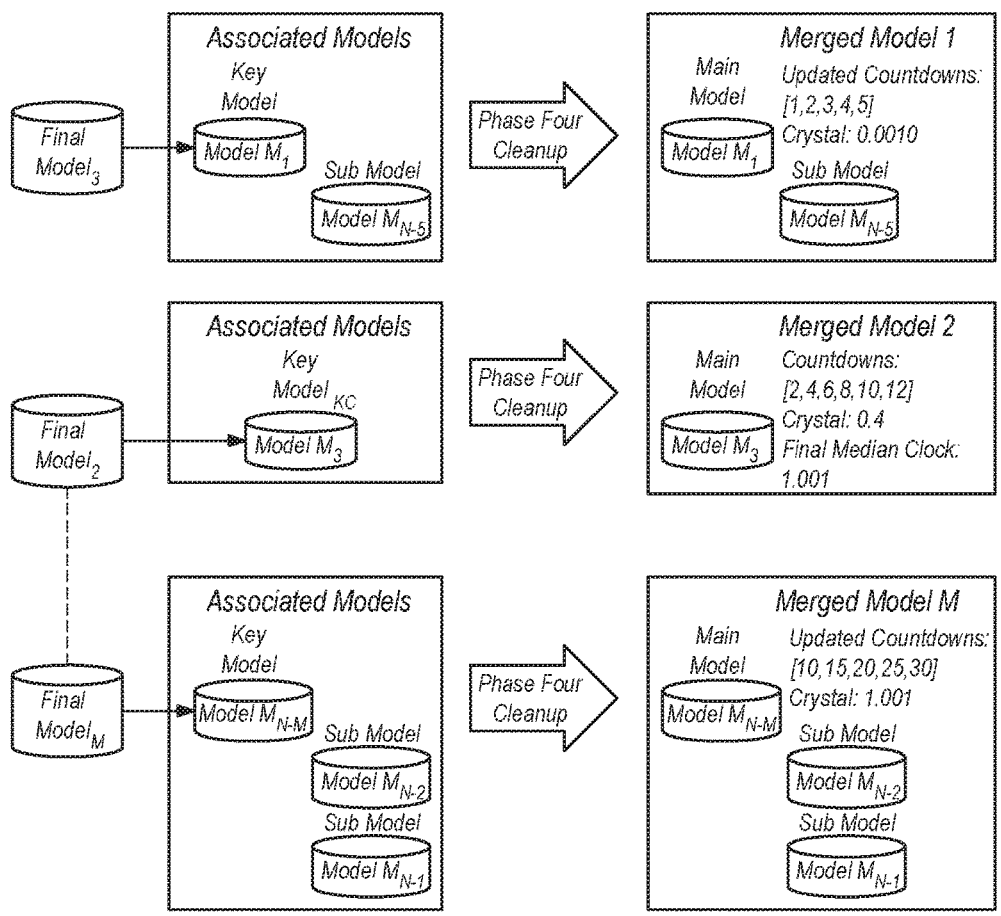
FIG. 15 is a block diagram, which illustrates cleanup phase four of the merging step of FIG. 12 in greater detail; and, FIG. 16 is a diagram, which illustrates how the systems and methods can use the final models for FIG. 15 to present a more accurate status of radars-of-interest that are actually present in a given area of responsibility.

Referring now to FIG. 14, the final phase of model merging, phase four, combines the results of phases one to three to define the final sets of all merged models (110 in FIG. 3). In each phase, the original radar models were grouped and combined to form subsets of models, each with a main (or key) model. The systems and methods of the present invention must track back from the output of phase three (109a and 109b) all the way to the start to determine which models belong to each subset and the final key model that should be maintained in the database. During phase four, the systems and methods of the present invention automatically cleans up the final merger output. An example of the cleanup process is illustrated in FIGS. 14 and 15, which uses theoretical models from FIGS. 12 and 13.

The set of all main models that result from the final phase of merging will be updated and maintained in the database. All tracks T associated with any of the aforementioned sub-models will be assigned to the new main model. Once the track updates are complete, the set of all sub-models will be deleted from the database, leaving a pared down list of final, merged models.

Figure 16:
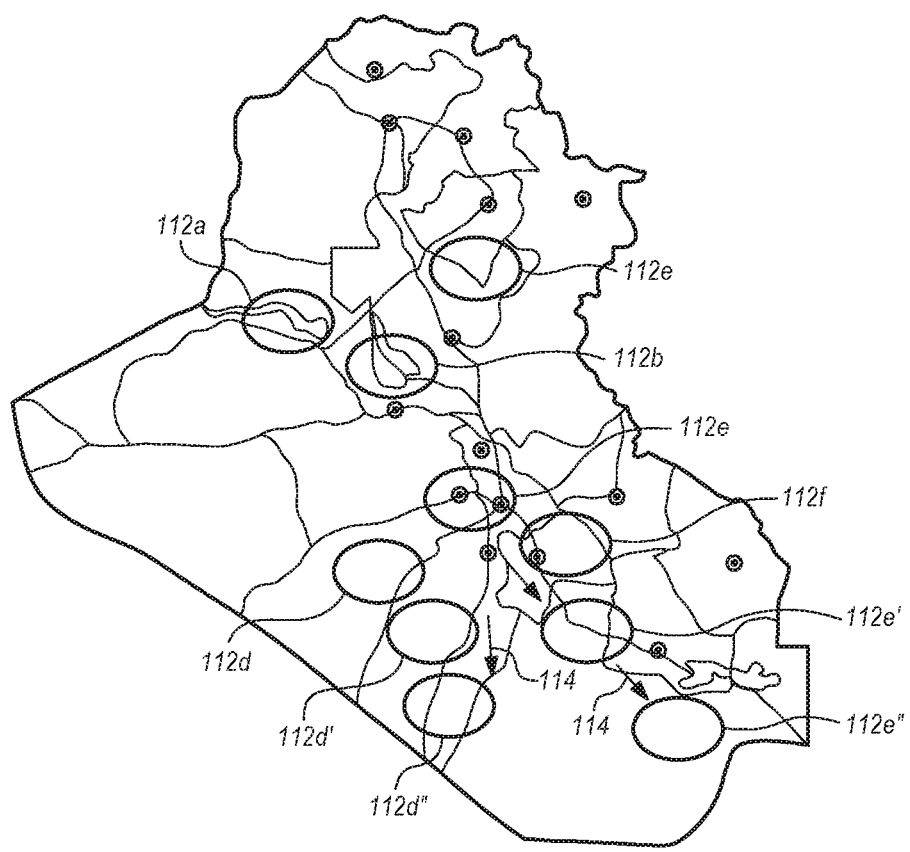

Referring now to FIG. 16, a map is shown which represents how the systems and methods of the present invention can operate to provide a clearer representation of radars of interest 16 that can be in a given area of responsibility (AOR). As shown in FIG. 16, the accomplishment of the invention methods can result in a determination that there are six separate radars 16 within the AOR, as depicted by results 112a-112f. If not for the systems and the methods of the present invention, the analyst might believe there are ten radars present, based on the emissions 14 information that is presented to the analyst. Importantly, however, the systems and methods have determined the results 112d, 112d' and 112d" are actually the same radar 16, which has been repositioned within the AOR over time in the direction indicated by arrows 114. Similarly, 112e, 112e' and 112e" are also the same radar 16, but repositioned as indicated.

The methods steps can be somewhat detailed and difficult to follow, in the absence of data. Thus, a detailed example of the systems and methods of the present invention which uses manufactured synthetic data follows below:

TRACK 1
Median Clock: 2.0015
Final Countdown: 10, 11, 12, 13, 14, 15, 16, 17
CONTACT REPORT INFO:

| | | | | | | | | |
|---|---|---|---|---|---|---|---|---|
| CR 1 | PRIs | 20 | 22 | 24 | 26 | 28 | 30 | 32 | 34 |
| | COUNTDOWN | 10 | 11 | 12 | 13 | 14 | 15 | 16 | 17 |
| | CLOCK | 2 | | | | | | | |
| CR 2 | PRIs | 20.0261 | 22.0191 | 24 | 26 | 28 | 30.0921 | 32 | 34 |
| | COUNTDOWN | 10 | 11 | 12 | 13 | 14 | 15 | 16 | 17 |
| | CLOCK | 2.0012 | | | | | | | |
| CR 3 | PRIs | 20 | 22 | 24 | 26.0428 | 28 | 30.1824 | 32.1209 | 34 |
| | COUNTDOWN | 10 | 11 | 12 | 13 | 14 | 15 | 16 | 17 |
| | CLOCK | 2.0035 | | | | | | | |
| CR 4 | PRIs | 20.0018 | 22.0407 | 24 | 26 | 28 | 30 | 32 | 34 |
| | COUNTDOWN | 10 | 11 | 12 | 13 | 14 | 15 | 16 | 17 |
| | CLOCK | 2.0003 | | | | | | | |
| CR 5 | PRIs | 20.0141 | 22 | 24.0942 | 26.0830 | 28 | 30 | 32 | 34 |
| | COUNTDOWN | 10 | 11 | 12 | 13 | 14 | 15 | 16 | 17 |
| | CLOCK | 2.0016 | | | | | | | |
| CR 6 | PRIs | 20.1676 | 22 | 24.0312 | 26 | 28 | 30 | 32.1328 | 34 |
| | COUNTDOWN | 10 | 11 | 12 | 13 | 14 | 15 | 16 | 17 |
| | CLOCK | 2.0028 | | | | | | | |
| CR 7 | PRIs | 20 | 22 | 24.1472 | 36 | 38 | 30.0221 | 32 | 34 |
| | COUNTDOWN | 10 | 11 | 12 | 13 | 14 | 15 | 16 | 17 |
| | CLOCK | 2.0014 | | | | | | | |
| CR 8 | PRIs | 20.0389 | 22 | 24.0533 | 26.1738 | 28 | 30 | 32 | 34 |
| | COUNTDOWN | 10 | 11 | 12 | 13 | 14 | 15 | 16 | 17 |
| | CLOCK | 2.0022 | | | | | | | |
| CR 9 | PRIs | 20.0429 | 22 | 24 | 26.0416 | 28 | 30 | 32 | 34 |
| | COUNTDOWN | 10 | 11 | 12 | 13 | 14 | 15 | 16 | 17 |
| | CLOCK | 2.0006 | | | | | | | |
| CR 10 | PRIs | 20.1794 | 22 | 24 | 26.0381 | 28 | 30.0634 | 32 | 34 |
| | COUNTDOWN | 10 | 11 | 12 | 13 | 14 | 15 | 16 | 17 |
| | CLOCK | 2.0022 | | | | | | | |

| | | TRACK 2 Median Clock: 4.0017 Final Countdown: 10, 11, 12, 13, 14, 15, 16, 17 CONTACT REPORT INFO: | | | | | | | |
|---|---|---|---|---|---|---|---|---|---|
| CR 1 | PRIs | 40 | 44 | 48 | 52 | 56 | 60 | 64 | 68 |
| | COUNTDOWN | 10 | 11 | 12 | 13 | 14 | 15 | 16 | 17 |
| | CLOCK | 4 | | | | | | | |
| CR 2 | PRIs | 40 | 44.0332 | 48 | 52 | 56.0384 | 60.0097 | 64 | 68 |
| | COUNTDOWN | 10 | 11 | 12 | 13 | 14 | 15 | 16 | 17 |
| | CLOCK | 4.0007 | | | | | | | |
| CR 3 | PRIs | 40 | 44 | 48.1696 | 52 | 56.1398 | 60.1661 | 64 | 68 |
| | COUNTDOWN | 10 | 11 | 12 | 13 | 14 | 15 | 16 | 17 |
| | CLOCK | 4.0043 | | | | | | | |
| CR 4 | PRIs | 40.0025 | 44 | 48 | 52 | 56.0387 | 60 | 64.0387 | 68 |
| | COUNTDOWN | 10 | 11 | 12 | 13 | 14 | 15 | 16 | 17 |
| | CLOCK | 4.0008 | | | | | | | |
| CR 5 | PRIs | 40.0924 | 44 | 48 | 52 | 56 | 60.1743 | 64 | 68 |
| | COUNTDOWN | 10 | 11 | 12 | 13 | 14 | 15 | 16 | 17 |
| | CLOCK | 4.0024 | | | | | | | |
| CR 6 | PRIs | 40.0335 | 44 | 48 | 52 | 56 | 60.1476 | 64.1559 | 68 |
| | COUNTDOWN | 10 | 11 | 12 | 13 | 14 | 15 | 16 | 17 |
| | CLOCK | 4.0034 | | | | | | | |
| CR 7 | PRIs | 40.0249 | 44 | 48.0075 | 52 | 56.1543 | 60 | 64 | 68 |
| | COUNTDOWN | 10 | 11 | 12 | 13 | 14 | 15 | 16 | 17 |
| | CLOCK | 4.0017 | | | | | | | |
| CR 8 | PRIs | 40.0049 | 44 | 48.0375 | 52 | 56 | 60.1243 | 64 | 68 |
| | COUNTDOWN | 10 | 11 | 12 | 13 | 14 | 15 | 16 | 17 |
| | CLOCK | 4.0016 | | | | | | | |
| CR 9 | PRIs | 40.0661 | 44 | 48 | 52.1396 | 56 | 60 | 64 | 68 |
| | COUNTDOWN | 10 | 11 | 12 | 13 | 14 | 15 | 16 | 17 |
| | CLOCK | 4.0017 | | | | | | | |
| CR 10 | PRIs | 40.0681 | 44 | 48.0040 | 52 | 56 | 60.1917 | 64 | 68 |
| | COUNTDOWN | 10 | 11 | 12 | 13 | 14 | 15 | 16 | 17 |
| | CLOCK | 4.0024 | | | | | | | |

| | | TRACK 3 Median Clock: 6.00175 Final Countdown: 10, 11, 12, 13, 14, 15, 16, 17 CONTACT REPORT INFO: | | | | | | | |
|---|---|---|---|---|---|---|---|---|---|
| CR 1 | PRIs | 60 | 66 | 72 | 78 | 84 | 90 | 96 | 102 |
| | COUNTDOWN | 10 | 11 | 12 | 13 | 14 | 15 | 16 | 17 |
| | CLOCK | 6 | | | | | | | |
| CR 2 | PRIs | 60 | 66 | 72.0546 | 78 | 84 | 90.1677 | 96.1914 | 102 |
| | COUNTDOWN | 10 | 11 | 12 | 13 | 14 | 15 | 16 | 17 |
| | CLOCK | 6.0042 | | | | | | | |
| CR 3 | PRIs | 60.1636 | 66 | 72 | 78.0380 | 84 | 90 | 96 | 102 |
| | COUNTDOWN | 10 | 11 | 12 | 13 | 14 | 15 | 16 | 17 |
| | CLOCK | 6.0014 | | | | | | | |
| CR 4 | PRIs | 60 | 66 | 72 | 78.1486 | 84.1263 | 90 | 96.0442 | 102 |
| | COUNTDOWN | 10 | 11 | 12 | 13 | 14 | 15 | 16 | 17 |
| | CLOCK | 6.0029 | | | | | | | |
| CR 5 | PRIs | 60 | 66 | 72.0673 | 78 | 84 | 90.0305 | 96.1218 | 102 |
| | COUNTDOWN | 10 | 11 | 12 | 13 | 14 | 15 | 16 | 17 |
| | CLOCK | 6.0021 | | | | | | | |
| CR 6 | PRIs | 60 | 66.1814 | 72 | 78.1239 | 84 | 90 | 96.1473 | 102 |
| | COUNTDOWN | 10 | 11 | 12 | 13 | 14 | 15 | 16 | 17 |
| | CLOCK | 6.0004 | | | | | | | |
| CR 7 | PRIs | 60 | 66 | 72.1690 | 78 | 84.1048 | 90 | 96 | 102 |
| | COUNTDOWN | 10 | 11 | 12 | 13 | 14 | 15 | 16 | 17 |
| | CLOCK | 6.0023 | | | | | | | |
| CR 8 | PRIs | 60.0859 | 66 | 72.0661 | 78 | 84 | 90.1302 | 96 | 102 |
| | COUNTDOWN | 10 | 11 | 12 | 13 | 14 | 15 | 16 | 17 |
| | CLOCK | 6.0024 | | | | | | | |
| CR 9 | PRIs | 60 | 66 | 72.1202 | 78 | 84 | 90 | 96.0307 | 102 |
| | COUNTDOWN | 10 | 11 | 12 | 13 | 14 | 15 | 16 | 17 |
| | CLOCK | 6.0013 | | | | | | | |
| CR 10 | PRIs | 60 | 66.0947 | 72 | 78 | 84.0173 | 90 | 96 | 102 |
| | COUNTDOWN | 10 | 11 | 12 | 13 | 14 | 15 | 16 | 17 |
| | CLOCK | 6.0009 | | | | | | | |

TRACK 4
Median Clock: 8.00225
Final Countdown: 10, 11, 12, 13, 14, 15, 16, 17
CONTACT REPORT INFO:

| | | | | | | | | | |
|---|---|---|---|---|---|---|---|---|---|
| CR 1 | PRIs | 80 | 88 | 96 | 104 | 112 | 120 | 128 | 136 |
| | COUNTDOWN | 10 | 11 | 12 | 13 | 14 | 15 | 16 | 17 |
| | CLOCK | 8 | | | | | | | |
| CR 2 | PRIs | 80.0944 | 88.1414 | 96.1455 | 104 | 112 | 120 | 128 | 136 |
| | COUNTDOWN | 10 | 11 | 12 | 13 | 14 | 15 | 16 | 17 |
| | CLOCK | 8.0028 | | | | | | | |
| CR 3 | PRIs | 80 | 88 | 96 | 104 | 112.146 | 120.0617 | 128 | 136 |
| | COUNTDOWN | 10 | 11 | 12 | 13 | 14 | 15 | 16 | 17 |
| | CLOCK | 8.002 | | | | | | | |
| CR 4 | PRIs | 80.0902 | 88 | 96 | 104 | 112.097 | 120 | 128.090 | 136 |
| | COUNTDOWN | 10 | 11 | 12 | 13 | 14 | 15 | 16 | 17 |
| | CLOCK | 8.0025 | | | | | | | |
| CR 5 | PRIs | 80 | 88 | 96.059 | 104.055 | 112.191 | 120 | 128 | 136 |
| | COUNTDOWN | 10 | 11 | 12 | 13 | 14 | 15 | 16 | 17 |
| | CLOCK | 8.0027 | | | | | | | |
| CR 6 | PRIs | 80.0282 | 88 | 96 | 104 | 112.192 | 120 | 128 | 136 |
| | COUNTDOWN | 10 | 11 | 12 | 13 | 14 | 15 | 16 | 17 |
| | CLOCK | 8.002 | | | | | | | |
| CR 7 | PRIs | 80.1637 | 88 | 96 | 104.0433 | 112.147 | 120 | 128 | 136 |
| | COUNTDOWN | 10 | 11 | 12 | 13 | 14 | 15 | 16 | 17 |
| | CLOCK | 8.0028 | | | | | | | |
| CR 8 | PRIs | 80.1419 | 88.1128 | 96.0306 | 104 | 112 | 120 | 128 | 136 |
| | COUNTDOWN | 10 | 11 | 12 | 13 | 14 | 15 | 16 | 17 |
| | CLOCK | 8.002 | | | | | | | |
| CR 9 | PRIs | 80.0073 | 88 | 96 | 104 | 112 | 120 | 128.0386 | 136 |
| | COUNTDOWN | 10 | 11 | 12 | 13 | 14 | 15 | 16 | 17 |
| | CLOCK | 8.0005 | | | | | | | |
| CR 10 | PRIs | 80.0146 | 88 | 96.1760 | 104.1981 | 112 | 120 | 128 | 136 |
| | COUNTDOWN | 10 | 11 | 12 | 13 | 14 | 15 | 16 | 17 |
| | CLOCK | 8.0032 | | | | | | | |

As stated above, to accomplish the correlation step 30, any external multi-source correlation methodology can be used to correlate radar emissions 14 to form tracks T. In the above detailed example, four (4) sample tracks T are presented, each with ten (10) contact reports (indicated by CR).

To accomplish the modeling step 40, the radar clock X can be estimated for each contact report on each of the four tracks using Equations (6)-(9). The clock for each contact report in the tables above is the $X_t$ associated with the minimum root mean square error (RMSE) in Equation (7) across all possible clock search sub-intervals for the track. As seen from the examples above, each contact report on a track can have a different clock value X than other contact reports (CR's) on the same track T. Slight variations in clock, as seen in the example, are produced by the same radar mode but indicate the presence of noisy data. Large variations in clock values indicate a change in radar mode M for the corresponding contact report. Therefore, one track could be defined by multiple clocks and their corresponding radar modes.

To further accomplish the modeling step 40, the countdown set C for each CR can be calculated using the associated contact report clock X, the received CR PRI values, and Equation (10).
The table below represents the results of 400-416 of FIG. 4 for the first contact report of Track 1 (Table 9 below).

To finalize the track clock and countdown set, for each track, all invalid clocks and their associated countdowns must be identified and eliminated. These invalid parameter values occur as the result of erroneous PRI data in as few as one contact report on the track. A final set of clocks and countdowns is determined for each track based on analysis of the contact report information.

In the sample tracks above, it can be seen that each track one through four has only one clock group (groups of contact reports with similar clocks). For track 1, the single clock group contains the set of all clocks [2, 2.0012, 2.0035, 2.0003, 2.0016, 2.0028, 2.0014, 2.0022, 2.0006, and 2.0022] which has a median clock of 2.0015. Furthermore, each contact report has the same set of countdowns [10, 11, 12, 13, 14, 15, 16, and 17]. Therefore, the final set of clocks for track 1 is the median clock (2.00015) and the final set of countdowns is [10, 11, 12, 13, 14, 15, 16, and 17]. The same goes for tracks 2-4 with final clocks set as the median clocks of each clock group, 4.0017, 6.00175, and 8.00225 respectively, and final countdowns [10, 11, 12, 13, 14, 15, 16, 17]. In a real world case, the final clock group countdown set would be determined based on analysis of the frequency of each count value across the whole track, as detailed in steps 418-464 and FIG. 8-9.

To explore one variation that could occur, suppose that the contact report below was part of track 1 (Table 10):

TABLE 9

| | | | | | | | | | |
|---|---|---|---|---|---|---|---|---|---|
| CR 1 | PRIs | 20 | 22 | 24 | 26 | 28 | 30 | 32 | 34 |
| | COUNTDOWN | 10 | 11 | 12 | 13 | 14 | 15 | 16 | 17 |
| | CLOCK | 2 | | | | | | | |

TABLE 10

| | | | | | | | | | |
|---|---|---|---|---|---|---|---|---|---|
| CR 11 | PRIs | 60 | 66 | 72 | 78 | 84 | 90 | 96 | 102 |
| | COUNTDOWN | 10 | 11 | 12 | 13 | 14 | 15 | 16 | 17 |
| | CLOCK | 6 | | | | | | | |

If CR11 was part of track 1, then track 1 would now have two clock groups:
Clock Group 1=[2, 2.0012, 2.0035, 2.0003, 2.0016, 2.0028, 2.0014, 2.0022, 2.0006, 2.0022]
Clock Group 2=[6]
The associated countdowns for each clock group would be:
Clock Group 1 Countdowns=[10, 11, 12, 13, 14, 15, 16, 17]
Clock Group 2 Countdowns=[10, 11, 12, 13, 14, 15, 16, 17]
Therefore, since both clock groups have the exact same final countdown set, we determine that both clock groups contain valid information for this radar. In this case, we define the final clocks for track 1 as the median of each clock group, [2.0015, 6], and the final contact report countdown set as [10, 11, 12, 13, 14, 15, 16, 17]. This scenario can occur with multiple valid clocks for each track.

To explore a different variation that could occur, suppose that the contact report below was part of track 1 (instead of the previous CR 11 above, Table 11).

TABLE 11

| CR 11' | PRIs | 1.5 | 3 | 4.5 | 6 | 7.5 | 9 | 10.5 | 12 |
|---|---|---|---|---|---|---|---|---|---|
| | COUNTDOWN | 1 | 2 | 3 | 4 | 5 | 6 | 7 | 8 |
| | CLOCK | 1.5 | | | | | | | |

If CR 11' would part of track 1 instead of CR 11, then track 1 would have two clock groups:
Clock Group 1=[2, 2.0012, 2.0035, 2.0003, 2.0016, 2.0028, 2.0014, 2.0022, 2.0006, 2.0022]
Clock Group 2=[1.5]
The associated countdowns for each clock group would be:
Clock Group 1 Countdowns=[10, 11, 12, 13, 14, 15, 16, 17]
Clock Group 2 Countdowns=[1, 2, 3, 4, 5, 6, 7, 8]
The final countdown set and clocks for track 1 in this scenario are determined by following steps 418-464 as described above and as shown in FIGS. 8 and 9. The master clock group is defined as clock group 1 since it contains the most contact reports. We compare clock group 2 countdowns to the master clock group countdowns (clock group 1 countdowns). Since there is no overlap between the two countdown sets, we determine that clock group 2 contains invalid information. Therefore, we define the final clock for track 1 as the median of clock group 1 (2.0015) and the final countdown set as [10, 11, 12, 13, 14, 15, 16, 17].

Continuing with the detailed example, which is informed by the data from the four tracks above, the final clock and countdown set for each of the original four tracks are defined in steps 600-616 (See FIG. 10) as follows:
Track 1: Final Clock=2.0015
  Final Countdown Set=[10, 11, 12, 13, 14, 15, 16, 17]
Track 2: Final Clock=4.0017
  Final Countdown Set=[10, 11, 12, 13, 14, 15, 16, 17]
Track 3: Final Clock=6.00175
  Final Countdown Set=[10, 11, 12, 13, 14, 15, 16, 17]
Track 4: Final Clock=8.00225
  Final Countdown Set=[10, 11, 12, 13, 14, 15, 16, 17]
Therefore, they all have identical countdown sets and one group of tracks can be formed from these four tracks.
Group 1: Clocks=[2.0015, 4.0017, 6.00175, 8.00225]
  Countdown=[10, 11, 12, 13, 14, 15, 16, 17]
This group is sent to the next step to determine the final two unknown parameters.

The final two unknown parameters, crystal and mode, can be determined for each group of tracks created from the previous steps of the invention methods. Each group of tracks is processed separately by the systems and methods of the present invention. The goal of this step can be to create a set of models or a single model, defined by clocks, countdown, crystal, and mode, for each group of tracks. The steps 700-722 described above and shown in FIGS. 11-15 can be followed for each group. The real valued crystal(s) that minimize the root mean squared error for a subset of the group clocks is determined to be the final crystal for the group. Once the best crystal is found, the mode(s) corresponding to each of the group clocks is calculated. Using the data above, the final model for the group of four sample tracks is defined as (Table 12):

TABLE 12

| CRYSTAL | 2.00068 | | | | | | |
|---|---|---|---|---|---|---|---|
| COUNTDOWN | 10 | 11 | 12 | 13 | 14 | 15 | 16 | 17 |
| CLOCKS | 2.0015 | 4.0017 | 6.00175 | 8.00225 | | | |
| MODES | 1 | 2 | 3 | 4 | | | |

To this point, the systems and methods of the present invention according to several embodiments have modeled radar based on observed PRIs. However, another way to characterize radars can be to use their radio frequency (RF) channels. Some radars operate on a single RF so that every transmitted pulse has the same RF. This can simplify the radar electronics and processing. Other radars, however, can utilize multiple RFs for a variety of reasons. Multiple RFs can be used to transmit pulses concurrently in different bands for frequency diversity; multiple RFs can mitigate interference from other radars operating in the same frequency band. Multiple RFs can also be used to provide spatial diversity because antennas can be designed that have different responses based on the RF of the pulse.

The RF can be a measure of how many oscillations per second are imposed on the electromagnetic wave of the radar pulse. The unit of measure for the amount of oscillations per second is the Hertz (Hz). A typical radar pulse will have an RF is the range of billions of Hz, or gigahertz (GHz), but are commonly described as thousands of megahertz (MHz). The set of RFs used by an emitter can be reverse engineered to find the fundamental channel spacing between the RFs as well as the integer RF multipliers.

The set of RFs used by a single radar to produce the observed pulse(s) can be reverse engineered to estimate additional identifying characteristics of the radar such as the fundamental RF channel spacing and the RF multipliers for each individual RF. More specifically, the RF channel spacing multiplied by the set of integer RF multipliers can generate the set of RFs that can be measured by the collector and provided as the input parameters by the systems and methods of the present invention. Note that the description below is analogous to that in the main disclosure where "PRI" is analogous to "RF," "clock" is analogous to "RF channel spacing," and "countdowns" are analogous to "RF multipliers". As such, some of the same language is used below to describe how to model a radar using these parameters.

Radars (particularly older models) may not generate their RFs by simply multiplying a single oscillator at the desired RF channel spacing value by an integer multiplier. Instead, they often use two or more local oscillators, each with different integer multipliers, which are mixed together in various arrangements to generate the final set of RFs. Somewhat surprisingly, these multiple oscillators combine together in such a way that they can also be thought of as being generated by a single oscillator. Stated differently, the oscillator can be characterized as a fundamental RF channel spacing multiplied by an integer (i.e. the RF multiplier). The reason for this may be that to avoid intermodulation products in the multiple mixing stages, the local oscillators must be chosen in such a way that this simple relationship for the output RFs holds true.

For example, an RF might be generated according to Equation (16):

$$RF = a_1 L_1 + a_2 L_2 + a_3 L_3 \quad (16)$$

with a∈Z and L are the local oscillators. Then for multiple RFs from a single emitter, we might have (Equation (17)):

$$RF = a_{1,i} L_1 + a_{2,i} L_2 + a_{3,i} L_3 \quad (17)$$

where the local oscillators may be multiplied by different integers to create the unique RFs or different oscillators may be used for each RF. As shown in the last term on the right above, sometimes the integer multiplier and local oscillators are fixed even for different RFs. It is infeasible to estimate these multiple parameters from the limited number of observables (i.e. more unknowns than Equations).

Though emitters often generate RFs according the Equations shown above, many can be reduced to the simple Equation (18):

$$RF_i = K_i * CS \quad (18)$$

where i is the index of the RF, K is the integer RF multiplier, and CS is the fundamental RF channel spacing. Note that CS may not represent a physical oscillator in the system, but is the result of a combination of one or more oscillators, and the integer K should not be confused with the integers "$a_i$" shown above that multiply the physical oscillators. Also, note that the local oscillators are typically distinct from the crystal (i.e. the fundamental oscillating source used in the radar) used to generate the PRIs.

From Equation (18), the channel spacing can be defined as:

$$CS = RF_i / K_i \quad (19)$$

One of several goals of this invention can be to automatically determine the various combinations of values that satisfy the system in (18) for collections of contact reports that are using the same type of radar for transmission, either from the same source or from different sources. Automation of this process will lead to the discovery of new integer RF multipliers for known models as well as the possible discovery of new, previously unknown, modes or types of radar. For example, if a set of integer RF multipliers shows a series of incrementing values, but one is missing, this may indicate that there is an unobserved mode or alternatively, a mode that has been observed, but not been correctly associated to this type of radar.

A single intercepted emission, called a contact report, can contain a single RF value or a set of RFs. The accuracy of the estimated parameters is improved with more contact reports (i.e. more RFs). Various multi-source correlation programs process collections of contact reports to combine them into radar tracks. The radar parameter values across a track should be the same or similar. More specifically, a single track will transmit pulses using a single type of radar, but successive transmissions may use a different RF.

As recited above, the process of forming radar parameter models consists of the following steps:

1. Correlation of radar transmissions, i.e. contact reports, to form comprehensive tracks (step 30 in FIG. 2);

2. Modeling of radar (step 40);
   a. Estimate an RF channel spacing from the whole track.
   b. Calculate integer RF multipliers based on estimated RF channel spacing and observed RFs.
   c. Eliminate RF channel spacing and integer RF multiplier outliers to determine a final RF channel spacing and integer RF multipliers for each track.
3. Grouping of tracks T with similar attributes, step 50, (ex: matching countdowns, similar clocks, and that the RFs divided by the estimated RF channel spacing generate integer multipliers that are consistent with previously derived integer RF multipliers).
4. Splitting of tracks (step 60):
   a. Estimate all possible crystal(s) for each group of tracks.
   b. Split groups of tracks into smaller groups based on best-fitting estimated crystal(s).
   c. Form a model for each crystal and associated countdowns and clocks.
5. Merging of similar models that were created by different batches of data (step 70).

Modeling step 40 and grouping step 50 can be slightly different for the embodiments where RF Channel is used as the initial variable. These embodiments can be described more fully below.

Track RF Channel Spacing Estimation

The first unknown parameter from (18) that is estimated by the invention during the modeling step 40 can be a hypothetical radar RF channel spacing. As explained above, this can be the value that is conceptually multiplied by a set of integer RF multipliers (unknown at this time) to create the set of RFs measured by the collector 12 (FIG. 1). An estimated RF channel spacing value can be determined for a track.

The only information known at this time is the set of real valued RFs for each contact report. The best RF channel spacing estimate for a track can be defined as the value that minimizes the error between the exact real valued RF multipliers in (18), using the known RFs and candidate RF channel spacing estimates, and the closest integer RF multiplier values (real valued RF multipliers rounded to the nearest integer). This value can be calculated based on the root mean square error over all the RFs in the track. Specifically, the best RF channel spacing estimate within a range [a, b] for a single track can be defined as the value that minimizes the root mean square error in Equation (20), see step (20):

$$RMSE(CS) = \sqrt{\frac{\sum_{i=0}^{n} \left( \frac{RF_i}{CS} - \text{round}\left(\frac{RF_i}{CS}\right) \right)^2}{n}} \text{ with } CS \in [a, b] \quad (20)$$

The RF channel spacing value that satisfies (20) could be found through an iterative broad search over all possible values within a defined search range [a, b] at a chosen granularity or through a more directed search as described for estimating the clock X and countdown C values using PRIs.

The minimum RMSE, as defined in (20) is used to determine the best RF channel spacing for the track. The RF channel spacing associated with the minimum RMSE is chosen as the estimated RF channel spacing for the track. Since a radar typically has fewer RFs than PRIs, the RF channel spacing is estimated over the entire track (where multiple RFs may be observed) as opposed to in each contact report as is done for PRI.

Track RF Multiplier Calculation

The second unknown parameter in (18) that is estimated by the invention can be the set of integer RF multipliers. This set of values is calculated for each contact report based on the estimated radar RF channel spacing described immediately above, and observed RFs. Each RF in a track can have a corresponding RF multiplier value, defined as $$K_i = \text{round}\left(\frac{RF_i}{CS}\right) \in Z \quad (21)$$

Once a final RF channel spacing estimate has been determined for a track, the associated RF multipliers are calculated using (21). The software will produce an RF channel spacing for each track and an RF multiplier for each observed RF.

Once the RF channel spacing and integer RF multipliers have been estimated, the expected RF values can be calculated by multiplying the estimated RF channel spacing by the estimated integer RF multipliers. These may differ from the observed RF values for a number of reasons, which can include radar local oscillator drift over time or temperature and measurement inaccuracy (possibly due to SNR or measurement resolution). Furthermore, depending on how noisy the observed RF values are, it is possible that the estimated RF channel spacing may be erroneous and the RF multipliers may be off by a small value such as ±1 MHz. A close estimate of the RF channel spacing and the general range of the integer RF multipliers is enough to add useful information to radar characterization.

Example results can be shown below for a simulated set of observed RF values in Table 13 below. In this example, the RF channel spacing is 4.22 MHz. The observed RF column shows potential noisy values that could be measured from the collected data. These values are put into Equation (20) to estimate the RF channel spacing and then the RF multipliers. From the multiplication of these estimated parameters, the estimated RF values can be calculated. Comparing these to the noise-free RF values shows that it is possible to correctly estimate the RF channel spacing and RF multipliers from just the noisy, observed RF values.

TABLE 13

Example RF Parameter Estimation

| | Observed RF (MHz) | Estimated RF Multiplier | Estimated RF (MHz) | Actual RF (MHz) | Error (MHz) |
| --- | --- | --- | --- | --- | --- |
| 1 | 1687.91 | 400 | 1688.00 | 1688.00 | 0.0 |
| 2 | 1692.02 | 401 | 1692.22 | 1692.22 | 0.0 |
| 3 | 1696.38 | 402 | 1696.44 | 1696.44 | 0.0 |
| 4 | 1700.53 | 403 | 1700.66 | 1700.66 | 0.0 |
| 5 | 1704.79 | 404 | 1704.88 | 1704.88 | 0.0 |
| 6 | 1730.24 | 410 | 1730.20 | 1730.20 | 0.0 |
| 7 | 1730.38 | 411 | 1734.42 | 1734.42 | 0.0 |
| 8 | 1738.74 | 412 | 1738.64 | 1738.64 | 0.0 |
| 9 | 1742.75 | 413 | 1742.86 | 1742.86 | 0.0 |
| 10 | 1747.22 | 414 | 1747.08 | 1747.08 | 0.0 |

Grouping Tracks with Matching RF Channel Spacing and RF Multipliers

Radar models are formed from groups of similar tracks. Calculation of the final two radar model parameters, crystal and mode(s), requires the presence of multiple clocks associated with a single countdown set. In most cases, this will not occur when only one track is used. Therefore, the use of many tracks is necessary. The RF channel spacing and RF multiplier values can add an extra layer of confidence to radar model generation. Thus, these values can be used as a stand-alone radar model, or they can be used in conjunction with the PRI/Clock/Countdown embodiments to increase the level of confidence of a resulting radar model.

In addition to the countdowns and clocks, the final set of integer RF multipliers and RF channel spacings for each track is used to compare tracks as well. The invention software automatically identifies and combines tracks with identical RF multipliers sets, regardless of their relative geographic location, to form groups. A single list of RF channel spacings for each track group is formed by combining all the RF channel spacings from all the tracks in the group. Each group of tracks is defined by this comprehensive list of RF channel spacings and the single set of integer RF multipliers.

When the integer RF multipliers from different tracks are not identical, they may still belong to the same physical emitter or class of emitter. Thus, a check must be performed to determine whether the RF multipliers are consistent with each other. For example, if the majority of the estimated RF multipliers are in the range [400,450] and another track has an estimated RF multiplier of, say, 140, they likely do not belong to the same emitter. However, if another track has an estimated RF multiplier in the range of the previously calculated values or very close (e.g. just outside the range), then RF multipliers for these tracks can be considered candidates for grouping.

Similarly, the RF channel spacing can also be used as a discriminator to determine which tracks should be grouped together. A threshold can be set such that if the tracks from two estimated RF channel spacings are within, say, ±0.5 MHz of one another, then these tracks should be grouped as well. Furthermore, if the channel spacings are integer multiples of one another (e.g. 4.22 MHz and 12.66 MHz), then these tracks should also be grouped because one track may have seen a different, more closely spaced set of RFs than another track.

Referring back to FIGS. 2 and 3, the groups of tracks with identical RF multiplier sets is sent to the splitting step 60 to produce robust radar parameter models complete with estimations of radar clock, countdowns, crystal, mode, RF channel spacing, and RF multipliers.

It should be appreciated that the resolution of the RF channel spacing to use in Equation (20) can be varied based on computing power, time constraints, and desired accuracy, and contract report/track density within a given area of interest. It should also be appreciated that, like with the embodiments wherein PRI in the initial variable considered, the calculation of the RF parameters in Equation 4 can be accomplished using a directed search to save processing time. For example, specific sub-ranges of the overall RF channel spacing search range can be targeted, which can speed the search instead of using a brute force search.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system, comprising:
   a receiver for collecting a plurality of radar emissions;
   a processor connected to said receiver, said processor containing non-transitory instructions for determining a plurality of Pulse Repetition Intervals (PRIs) corresponding to said plurality of radar emissions by accomplishing the following steps;
   A) calculating a plurality of clocks $X_i$ using said calculated PRIs;
   B) defining a clock range and a clock interval for said plurality for clocks $X_i$ from said PRIs;
   C) estimating a clock X using a root mean square error (RMSE) method, but only for said plurality of clocks $X_i$ from said step A) that are within said clock range; and,
   D) calculating a set of countdowns $C_i$ corresponding to said plurality of said PRI's using said estimated clock X from said step C) that was calculated using said RMSE method.

2. The system of claim 1, wherein said processor written instructions further calculate a mode M based on said set of countdowns $C_i$, and a crystal b based on said mode M.

3. The system of claim 1, wherein said plurality of radar emissions are received in real time.

4. The system of claim 2, further comprising:
   a database of stored emissions;
   said processor calculating said plurality of clocks $X_i$, said set of countdowns $C_i$, said mode M and said crystal b using said database of stored emissions and said plurality of stored emissions from said receiver simultaneously.

* * * * *